United States Patent
Park et al.

(10) Patent No.: US 8,851,749 B2
(45) Date of Patent: Oct. 7, 2014

(54) APPARATUS AND METHOD FOR MEASURING THE TEMPERATURE OF A MATERIAL

(75) Inventors: Yong Kook Park, Anyang-si (KR); Hyuk Jin Song, Danjin-gun (KR); Sung Hyuk Lim, Dangjin-gun (KR); Gap Soo Lim, Busan (KR); Seung Han Cho, Incheon (KR)

(73) Assignee: Hyundai Steel Company, Incheon (KR)

( * ) Notice: Subject to any disclaimer, the term of this patent is extended or adjusted under 35 U.S.C. 154(b) by 106 days.

(21) Appl. No.: 13/376,824

(22) PCT Filed: Dec. 28, 2010

(86) PCT No.: PCT/KR2010/009412
§ 371 (c)(1),
(2), (4) Date: Dec. 7, 2011

(87) PCT Pub. No.: WO2011/105691
PCT Pub. Date: Sep. 1, 2011

(65) Prior Publication Data
US 2012/0128027 A1     May 24, 2012

(30) Foreign Application Priority Data

Feb. 26, 2010 (KR) .................. 10-2010-0017473
Feb. 26, 2010 (KR) .................. 10-2010-0017475
Apr. 29, 2010 (KR) .................. 10-2010-0039871
Apr. 29, 2010 (KR) .................. 10-2010-0039873

(51) Int. Cl.
*G01K 1/08* (2006.01)
*G01N 1/00* (2006.01)
*G01J 5/04* (2006.01)
*G01J 5/08* (2006.01)
*G01J 5/02* (2006.01)
*G01K 1/14* (2006.01)
*G01J 5/00* (2006.01)
*B21B 38/00* (2006.01)

(52) U.S. Cl.
CPC ............... *G01J 5/0022* (2013.01); *G01J 5/048* (2013.01); *B21B 38/006* (2013.01); *G01J 5/084* (2013.01); *G01J 5/047* (2013.01); *G01J 5/029* (2013.01); *G01J 5/02* (2013.01); *G01K 1/143* (2013.01); *G01J 5/08* (2013.01); *G01J 5/04* (2013.01); *G01J 5/0275* (2013.01)
USPC .......................................... 374/141; 73/863

(58) Field of Classification Search
USPC ............................................... 73/39; 374/141
See application file for complete search history.

(56) References Cited

U.S. PATENT DOCUMENTS 5,361,788 A * 11/1994 Cole et al. .................. 134/64 R
5,615,953 A * 4/1997 Moskal ............................ 374/7

(Continued)

FOREIGN PATENT DOCUMENTS

CN     1269503 A     10/2000
CN     101301661 A     11/2008

(Continued)

OTHER PUBLICATIONS

International Search Report dated Sep. 7, 2011 of PCT/KR2010/009412 and its English Translation—6 pages.

*Primary Examiner* — Lisa Caputo
*Assistant Examiner* — Nasir U Ahmed
(74) *Attorney, Agent, or Firm* — Knobbe Martens Olson & Bear LLP

(57) ABSTRACT

An apparatus for measuring a temperature of a material includes a body unit disposed on an exit side of a heating furnace; a temperature measuring unit installed on the body unit and constructed to measure a temperature of a material which is extracted from the heating furnace; a foreign substance removing unit installed on the body unit and constructed to inject a fluid toward the material so as to remove foreign substances adhered to the material; and a moving unit installed on the body unit and constructed to move the temperature measuring unit.

19 Claims, 30 Drawing Sheets

(56) References Cited

U.S. PATENT DOCUMENTS

| | | | |
|---|---|---|---|
| 5,690,734 A * | 11/1997 | Imaeda et al. | 117/18 |
| 6,853,874 B2 * | 2/2005 | Kawada et al. | 700/213 |
| 2007/0217480 A1 * | 9/2007 | Lai | 374/208 |
| 2009/0028210 A1 * | 1/2009 | Kanamori et al. | 374/100 |
| 2009/0279771 A1 * | 11/2009 | Stapfer | 382/137 |

FOREIGN PATENT DOCUMENTS

| | | |
|---|---|---|
| JP | 60-192231 A | 9/1985 |
| JP | 62-030926 A | 2/1987 |
| JP | 07-055587 A | 3/1995 |
| KR | 10-2003-0049337 A | 6/2003 |

* cited by examiner

APPARATUS AND METHOD FOR MEASURING THE TEMPERATURE OF A MATERIAL

BACKGROUND

1. Field

Embodiments of the present invention relate to an apparatus and a method for measuring the temperature of a material, and more particularly, to an apparatus and a method for measuring the temperature of a material, which can remove foreign substances, such as scale, formed on the surface of a material, thereby improving the reliability of the measurement of the temperature of the material.

2. Description of the Related Technology

In general, a heating furnace is a device for heating a material, such as a slab and the like, approximately to a temperature of 1,200~1,300° C. using a fuel such as gas and oil in a hot strip mill, etc. of an iron works. The heating furnace is disposed for a previous process of a hot rolling process for forming a material into a product such as a steel plate.

While the administration of the metallurgical condition, dimension and appearance of a material for a corresponding standard is implemented actually in a rolling line, the material should be heated to a desired temperature for precise administration.

These statements are presented as a background art for facilitating the understanding of the present invention, and do not mean a relevant prior art generally known in the art to which the invention pertains.

SUMMARY

An embodiment of the present invention relates to an apparatus and a method for measuring the temperature of a material, which can remove foreign substances, such as scale, formed on the surface of a material, thereby improving the reliability of the measurement of the temperature of the material.

In one embodiment, an apparatus for measuring a temperature of a material includes: a body unit disposed on an exit side of a heating furnace; a temperature measuring unit installed on the body unit and constructed to measure a temperature of a material which is extracted from the heating furnace; a foreign substance removing unit installed on the body unit and constructed to inject a fluid toward the material so as to remove foreign substances adhered to the material; and a moving unit installed on the body unit and constructed to move the temperature measuring unit.

Preferably, the apparatus further includes a protection unit constructed to cover the temperature measuring unit; and the protection unit includes a protection member mounted to the body unit to be capable of sliding movement and constructed to selectively cover the temperature measuring unit, and an opening and closing member constructed to slidingly move the protection member.

More preferably, the body unit includes a fixed member on which the temperature measuring unit is installed and a frame member constructed to support the fixed member, and the protection unit is mounted to the fixed member and prevents the temperature measuring unit and the material from colliding each other.

Preferably, the moving unit includes a rotation gear part installed on the body unit and constructed to be rotated by driving of a driving member; and a rack gear part meshed with the rotation gear part and constructed to guide upward and downward movement of the rotation gear part.

Preferably, the temperature measuring unit includes a thermometer for measuring the temperature of the material; a displacement sensor for sensing a distance between the thermometer and the material; and a foreign substance blocking section constructed to inject a fluid above the temperature measuring unit so as to prevent foreign substances adhered to the material from dropping to the temperature measuring unit.

Preferably, the moving unit includes a forward and rearward moving unit constructed to move the temperature measuring unit toward a center portion of the material; and an upward and downward moving unit constructed to move the temperature measuring unit downward toward the material.

More preferably, the upward and downward moving unit includes a first rotation gear part constructed to be rotated by driving of a first driving member which is installed on the body unit, and a first rack gear part meshed with the first rotation gear part and constructed to guide upward and downward movement of the first rotation gear part; and the forward and rearward moving unit includes a support plate coupled to the first rack gear part, a second rotation gear part constructed to be rotated by driving of a second driving member which is installed on the support plate, and a second rack gear part meshed with the second rotation gear part and constructed to guide forward and rearward movement of the second rotation gear part.

More preferably, the temperature measuring unit includes a thermometer for measuring the temperature of the material; a displacement sensor for sensing a distance between the thermometer and the material; and a foreign substance blocking section constructed to inject a fluid below the temperature measuring unit so as to prevent foreign substances adhered to the material from entering the temperature measuring unit.

Preferably, the temperature measuring unit includes: a temperature measuring section constructed to be brought into contact with the material and measure the temperature of the material; and a contact sensing section connected with the temperature measuring section and constructed to sense whether or not the temperature measuring section and the material are brought into contact with each other.

More preferably, the temperature measuring section includes a contact part constructed to contact the material; a thermocouple disposed in the contact part; and a heat conductive part provided in the contact part and constructed to transfer heat of the material transferred to the contact part, to the thermocouple.

More preferably, the contact sensing section includes a support part constructed to be connected with the contact part; a housing constructed to guide upward and downward movement of the support part; and a sensor part installed in the housing and constructed to sense movement of the support part due to contact between the contact part and the material.

More preferably, the contact sensing section further includes a partition wall dividing a space in the housing into an upper space and a lower space and constructed to allow the support part to pass therethrough; a first stopper secured to an outer surface of the support part and disposed in the lower space; and an elastic member having one end which is connected to an upper surface of the first stopper and the other end which is connected to a lower surface of the partition wall, thereby providing a returning force to the support part.

More preferably, a metal element is attached to an upper end of the support part and is positioned lower than the sensor part, and an outer diameter of the first stopper is the same as an inner diameter of the housing which defines the lower space.

More preferably, the contact sensing section further includes a second stopper secured to the outer surface of the support part and disposed in the upper space, and wherein an outer diameter of the second stopper is the same as an inner diameter of the housing which defines the upper space.

More preferably, the moving unit includes a leftward and rightward moving unit constructed to move the temperature measuring unit leftward and rightward, and an upward and downward moving unit constructed to move the temperature measuring unit upward and downward; the upward and downward moving unit includes an upward and downward rotation gear part provided to the body unit and constructed to be rotated by driving of the upward and downward driving member, and an upward and downward rack gear part meshed with the upward and downward rotation gear part and constructed to guide upward and downward movement of the upward and downward rotation gear part; and the leftward and rightward moving unit includes a connection plate connected with the upward and downward rack gear part, a leftward and rightward rotation gear part constructed to be rotated by driving of a leftward and rightward driving member installed on the connection plate, and a leftward and rightward rack gear part meshed with the leftward and rightward rotation gear part and constructed to guide leftward and rightward movement of the leftward and rightward rotation gear part.

More preferably, the moving unit includes a rotation gear part installed on the body unit and constructed to be rotated by driving of a driving member, and a rack gear part meshed with the rotation gear part and constructed to guide upward and downward movement of the rotation gear part; and the body unit includes a fixed member having the temperature measuring unit installed thereon, and a frame member constructed to support the fixed member and having the rotation gear part installed thereon.

In another embodiment, a method for measuring a temperature of a material includes: moving an apparatus for measuring a temperature of a material, toward a material when the material extracted from a heating furnace enters a predetermined position; and removing foreign substances adhered to the material while a predetermined distance between the material and the apparatus for measuring a temperature of a material is maintained, and measuring the temperature of the material.

Preferably, the measuring of the temperature of the material determines whether or not the material and the apparatus for measuring the temperature of a material are maintained at the predetermined distance, by using a displacement sensor which is provided to the apparatus for measuring the temperature of a material.

In another embodiment, a method for measuring a temperature of a material includes: moving a temperature measuring unit toward a material when the material extracted from a heating furnace is placed on a roller table; injecting a fluid toward the material through a foreign substance removing unit to remove foreign substances adhered to the material; and measuring a temperature of the material by bringing the temperature measuring unit into contact with the material removed with the foreign substances.

BRIEF DESCRIPTION OF THE DRAWINGS

The above and other aspects, features and advantages of the invention will become apparent from the following detailed description in conjunction with the accompanying drawings, in which.

DETAILED DESCRIPTION OF THE EMBODIMENTS

Hereinafter, an apparatus and a method for measuring the temperature of a material according to embodiments of the present invention will be described with reference to accompanying drawings. However, the embodiments are for illustrative purposes only and are not intended to limit the scope of the invention. The drawings are not to scale and the proportion of certain elements may be exaggerated for the purpose of illustration.

Figure 1:
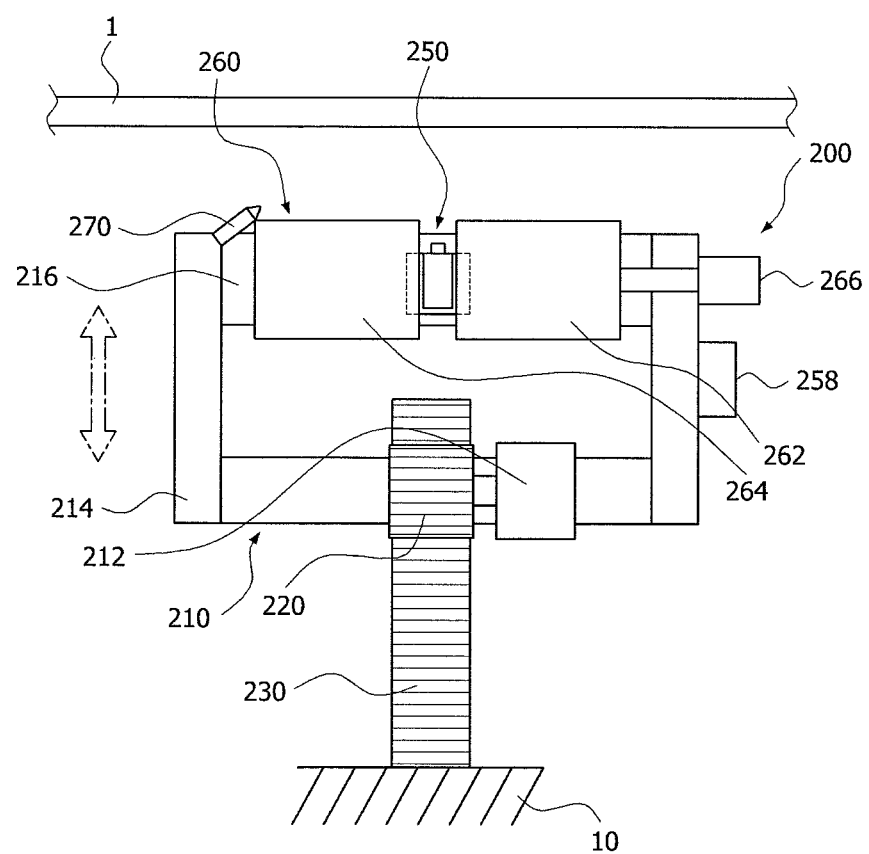
FIG. 1 is a view schematically illustrating an apparatus for measuring the temperature of a material in accordance with a first embodiment of the present invention.
Figure 2:
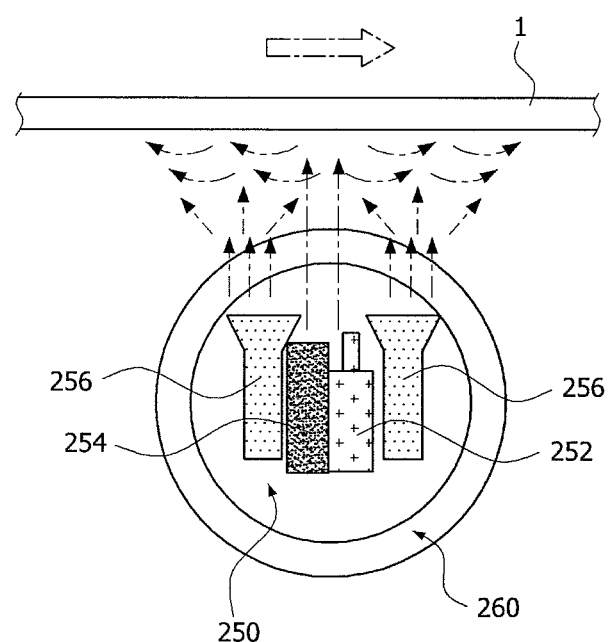
FIG. 2 is a cross-sectional view schematically illustrating the temperature measuring unit of the apparatus for measuring the temperature of a material in accordance with the first embodiment of the present invention.

Referring to FIGS. 1 and 2, an apparatus 200 for measuring the temperature of a material in accordance with a first embodiment of the present invention is disposed on the exit side of a heating furnace (not shown) and measures the temperature of a material 1 which is extracted from the heating furnace.

The apparatus 200 for measuring the temperature of a material is placed below the material 1 which is transferred to a roughing mill for performing a post process, by a roller table (not shown). The apparatus 200 for measuring the temperature of a material includes a body unit 210, a temperature measuring unit or temperature measurement device 250, a protection unit or protector 260, and a foreign substance removing unit or injector 270. The body unit 210 is installed to be capable of being moved upward and downward, and includes a driving member 212, a frame member 214 and a fixed member 216.

The driving member 212 includes a motor which generates power for moving the body unit 210 upward and downward, and is mounted to the frame member 214.

In the present embodiment, the frame member 214 is exemplified as being formed into the substantial shape of U. That is to say, the frame member 214 is constructed into a shape which includes a horizontal frame (not numbered) extending in the horizontal direction and a pair of side frames (not numbered) extending in the vertical direction from both ends of the horizontal frame.

The fixed member 216 is fixed to the frame member 214. The fixed member 216 is mounted to the distal ends of the side frames of the frame member 214 to extend in the horizontal direction. The temperature measuring unit 250 and the foreign substance removing unit 270 are installed on the fixed member 216.

The apparatus 200 for measuring the temperature of a material further includes a moving unit or movement mechanism 220 and 230 for raising and lowering the body unit 210. The moving unit 220 and 230 is constituted by a rotation gear part 220 and a rack gear part 230.

The rotation gear part 220 is installed to be connected with the driving member 212 and is rotated by receiving power from the driving member 212. The rack gear part 230 is fastened to an external device 10 and meshes with the rotation gear part 220 to guide the movement of the rotation gear part 220. Since the external device 10 is to fasten the rack gear part 230, the external device 10 may of course be replaced with a roller table, etc. so long as the rack gear part 230 may be fastened.

In the present embodiment, the rack gear part 230 is exemplified as extending in the vertical direction and providing a vertical movement path. The rotation gear part 220 rotated by receiving power from the driving member 212 meshes with the rack gear part 230 and moves in the vertical direction. The body unit 210 is moved in the vertical direction by such movement of the rotation gear part 220.

Meanwhile, although it is illustrated in the present embodiment that the driving member 212 connected with the rotation gear part 220 is installed on the body unit 210 and the rack gear part 230 is fastened to the external device 10, it is to be noted that the present invention is not limited to such a structure. In other words, it is conceivable that the driving member 212 having the rotation gear part 220 installed thereon may be fastened to the external device 10 and the rack gear part 230 may be installed on the body unit 210, so that a variety of modifications for upward and downward movement of the body unit 210 may be contemplated.

The temperature measuring unit 250 is installed on the body unit 210. In detail, the temperature measuring unit 250 is installed on the fixed member 216 and functions to measure the temperature of the material 1, and includes a thermometer 252, a displacement sensor 254 and foreign substance blocking sections 256.

The thermometer 252 measures the temperature of the material 1. In the present embodiment, the thermometer 252 is exemplified as a pyrometer. The pyrometer may measure the temperature of the material 1 by focusing radiation heat emitted from the material 1 to a heat receiving plate, such as a platinum plate coated with soot, using a concave mirror or a lens made of fluorite, and by measuring the temperature of the heat receiving plate using a thermoelectric thermometer. Since the detailed structure and function of such thermometer 252 are well known to those skilled in the art, detailed description thereof will be omitted herein.

The displacement sensor 254 senses the distance between the thermometer 252 and the material 1. In the present embodiment, the displacement sensor 254 is exemplified as a laser displacement sensor. Such a displacement sensor 254 is installed at the same height as the thermometer 252, and may measure the distance between the surface of the material 1 and the thermometer 252 in real time by radiating a laser beam toward the surface of the material 1, receiving the laser beam reflected from the surface of the material 1 and calculating the distance to the material 1.

The foreign substance blocking sections 256 function to inject a fluid with a high pressure over the temperature measuring unit 250 so as to prevent the foreign substances adhered to the material 1 and removed by the foreign substance removing unit 270 from dropping to the temperature measuring unit 250, specifically, to the thermometer 252 and the displacement sensor 254. Due to this fact, the operation precisions of the thermometer 252 and the displacement sensor 254 may be improved. In the present embodiment, the fluid injected by the foreign substance blocking sections 256 is exemplified as air.

The temperature measuring unit 250 further includes a driving control section 258. The driving control section 258 is connected with the displacement sensor 254 and controls the operation of the driving member 212.

The distance information between the surface of the material 1 and the thermometer 252 measured by the displacement sensor 254 is transmitted to the driving control section 258 in real time. The driving control section 258, which receives in real time the distance information between the surface of the material 1 and the thermometer 252 from the displacement sensor 254, controls the operation of the driving member 212 and maintains the distance between the surface of the material 1 and the thermometer 252 to a predetermined distance. Due to this fact, while the material 1 extracted from the heating furnace is transferred to the roller table by an extractor (not shown), the distance between the surface of the material 1 and the thermometer 252 may be maintained as the predetermined distance.

The apparatus 200 for measuring the temperature of a material includes the foreign substance removing unit 270. The foreign substance removing unit 270 is installed on the body unit 210, specifically, the fixed member 216, and injects a fluid with a high pressure toward the material 1 before the temperature of the material 1 is measured, to remove foreign substances such as scale produced on the lower surface of the material 1. By this fact, it is possible to suppress an error from occurring between an actual value and a measured value in the temperature of the material 1 due to the presence of the foreign substances adhered to the lower surface of the material 1.

The apparatus 200 for measuring the temperature of a material includes the protection unit 260. The protection unit 260 is formed into a roller-like shape and is rotatably installed on the body unit 210. The protection unit 260 protects the temperature measuring unit 250 from the material 1, and includes protection members 262 and 264 and an opening and closing member 266.

The protection members 262 and 264 are rotatably installed on the fixed member 216. In the present embodiment, the respective protection members 262 and 264 are exemplified as being divided into a first protection member 262 and a second protection member 264. The first protection member 262 and the second protection member 264 are installed to be rotatable about the fixed member 216, and can be rotated in the transfer direction of the material 1 when they are brought into contact with the material 1.

According to the present embodiment, the protection members 262 and 264 are formed in such a manner that the distance between the outer surfaces of the protection members 262 and 264 and the material 1 is shorter than the distance between the distal end of the temperature measuring unit 250 and the material 1. Namely, the protection members 262 and 264 are formed to project more than the temperature measuring unit 250 toward the material 1.

Accordingly, in the event that the material 1 is abruptly lowered toward the temperature measuring unit 250, the protection members 262 and 264 are first brought into contact with the material 1 to prevent the occurrence of collision between the material 1 and the temperature measuring unit 250, whereby it is possible to prevent the temperature measuring unit 250 from being broken by the material 1.

Figure 3:
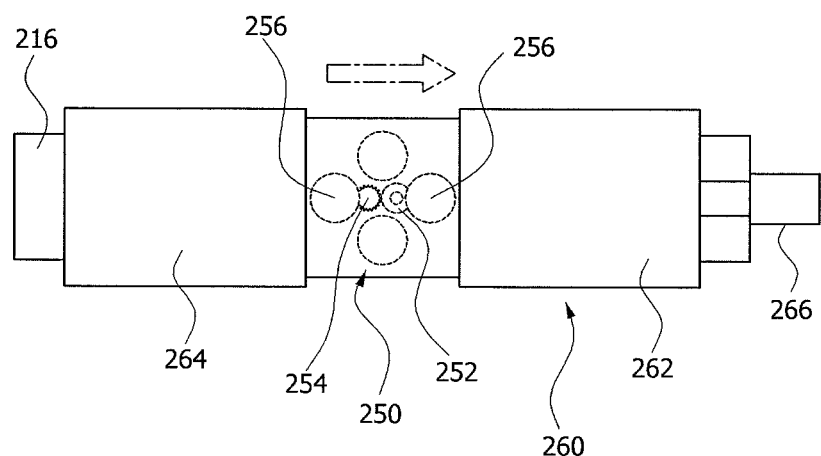
FIGS. 3 and 4 are views illustrating operating states of the protection unit of the apparatus for measuring the temperature of a material in accordance with the first embodiment of the present invention.
Figure 4:
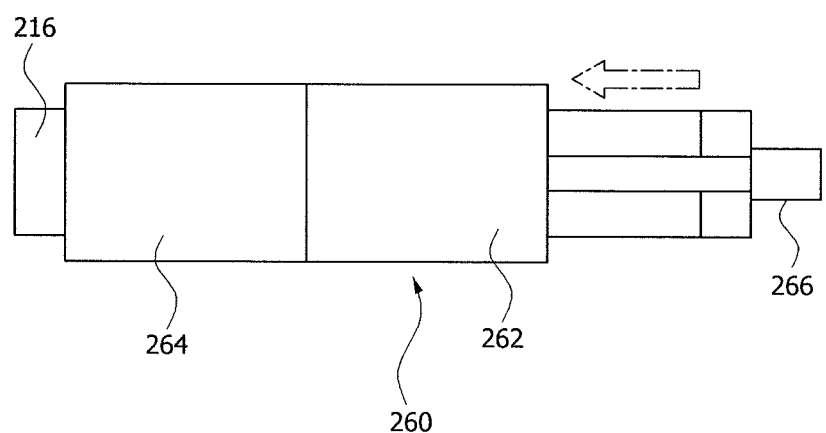
Figure 5:
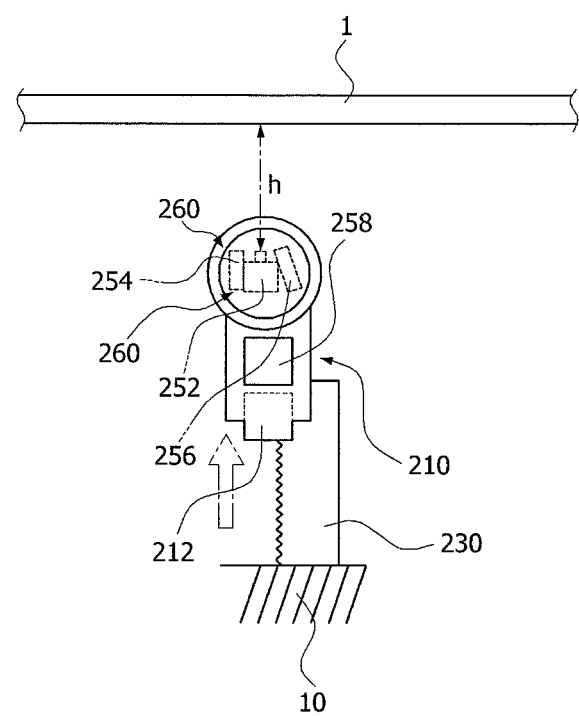
FIG. 5 is a view illustrating a state in which the apparatus for measuring the temperature of a material in accordance with the first embodiment of the present invention is moved toward a material.
Figure 6:
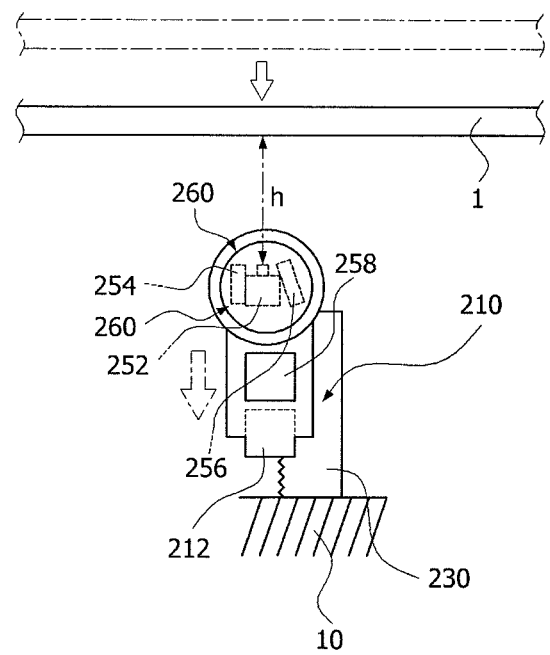
FIG. 6 is a view illustrating a state in which the apparatus for measuring the temperature of a material in accordance with the first embodiment of the present invention is moved with a predetermined distance maintained between the apparatus and the material.
Figure 7:
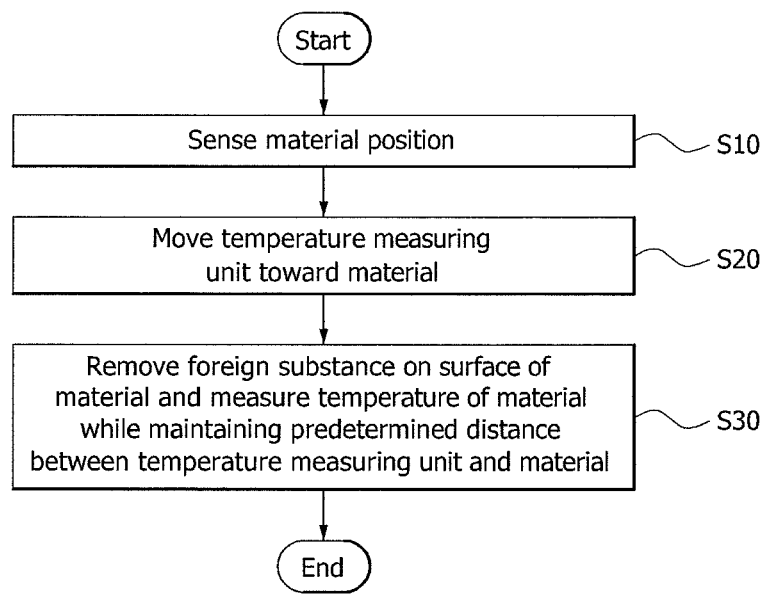
FIG. 7 is a flow chart explaining a method for measuring the temperature of a material by using the apparatus for measuring the temperature of a material in accordance with the first embodiment of the present invention.

Referring to FIGS. 3 and 4, as the protection members 262 and 264 slide leftward and rightward, they expose the temperature measuring unit 250 to an outside or prevent the exposure of the temperature measuring unit 250 to the outside. When the first protection member 262 and the second protection member 264 are brought into contact with each other, the temperature measuring unit 250 is prevented from being exposed to the outside (see FIG. 4), and when the first protection member 262 is slidingly moved in the direction facing away from the second protection member 264, the temperature measuring unit 250 is exposed toward the material 1 in the space between the first protection member 262 and the second protection member 264 (see FIG. 3).

The opening and closing member 266 drives the first protection member 262 under the control of the driving control section 258 and selectively exposes the temperature measuring unit 250 to the outside. According to the present embodiment, the opening and closing member 266 includes a hydraulic cylinder which is connected with the first protection member 262. The opening and closing member 266 selectively exposes the temperature measuring unit 250 to the outside, by moving the first protection member 262 in the direction facing the second protection member 264 or in the direction facing away from the second protection member 264, using the power generated by the hydraulic cylinder.

While it is exemplified in the present embodiment that the opening and closing member 266 is connected with and moves the first protection member 262, it is to be noted that the present invention is not limited to such. That is to say, the opening and closing member 266 may selectively expose the temperature measuring unit 250 to the outside by being connected with and moving the second protection member 264, or may selectively expose the temperature measuring unit 250 to the outside by being connected with and moving both the first protection member 262 and the second protection member 264, so that a variety of modifications may be contemplated.

The protection unit 260, which selectively exposes the temperatures measuring unit 250 to the outside, protects the temperature measuring unit 250 from foreign substances such as dust or the like. In other words, when the temperature measuring unit 250 does not operate, the protection unit 260 prevents the temperature measuring unit 250 from being exposed to the outside so that it is possible to prevent foreign substances such as dust from dropping toward the temperature measuring unit 250. In this way, the protection unit 260 protects the temperature measuring unit 250 from foreign substances.

When the temperature measuring unit 250 operates, the protection unit 260 allows the temperature measuring unit 250 to be exposed toward the material 1 such that the temperature measuring unit 250 can perform the operation of measuring the temperature of the material 1.

Hereafter, a method for measuring the temperature of a material using the apparatus 200 for measuring the temperature of a material in accordance with the first embodiment of the present invention will be described with reference to FIGS. 1 to 7.

In order to measure the temperature of the material 1, the position of the material 1 which is transferred from a heating furnace is sensed (S10). After being extracted from the heating furnace, the material 1 is transferred onto a roller table by an extractor. The apparatus 200 for measuring the temperature of a material is disposed below the roller table, and if entrance of the material 1 to the extractor is sensed, an operation for measuring a temperature is started.

When the sensed material 1 is transferred to a predetermined position, that is, when the material 1 is placed on the extractor in the embodiment of the present invention, the apparatus 200 for measuring the temperature of a material, which is disposed below the roller table, is moved toward the lower surface of the material 1 (S20). The apparatus 200 for measuring the temperature of a material is moved until the distance between the material 1 and the temperature measuring unit 250 approaches a predetermined distance h. In the present embodiment, the predetermined distance means a distance through which the foreign substances adhered to the lower surface of the material 1 may be optimally removed by the foreign substance removing unit 270, and may be appropriately controlled depending upon the kind of the material 1.

According to the present embodiment, the movement of the temperature measuring unit 250 is implemented through the operation of the driving member 212. That is to say, if the extractor senses the entrance of the material 1 and transmits a signal to the driving control section 258, the driving control section 258 controls the operation of the driving member 212 such that the body unit 210 is moved upward in the direction facing the material 1. The temperature measuring unit 250 is moved toward the material 1 by the body unit 210 moved in this way.

Further, the driving control section 258 controls the operation of the protection unit 260 and exposes the temperature measuring unit 250 to the outside. In other words, the driving control section 258 controls the operation of the opening and closing member 266 to slide the protection members 262 and 264 such that the temperature measuring unit 250 is exposed to the outside and may perform the operation of measuring the temperature of the material 1.

In the meanwhile, if it is not necessary to operate the temperature measuring unit 250, the driving control section 258 controls the operation of the protection unit 260 such that the temperature measuring unit 250 is not exposed to the outside. Namely, the driving control section 258 controls the operation of the opening and closing member 266 to cause the protection members 262 and 264 not to expose the temperature measuring unit 250 to the outside, thereby protecting the temperature measuring unit 250 from foreign substances.

If the temperature measuring unit 250 is moved toward the material 1, the driving control section 258 operates the foreign substance removing unit 270 and the temperature measuring unit 250. Accordingly, the foreign substance removing unit 270 injects the fluid with a high pressure to the lower surface of the material 1 and removes the foreign substances adhered to the surface of the material 1, and the temperature measuring unit 250 measures the temperature of the material 1 from which the foreign substances are removed (S30).

The temperature measuring unit 250 measures the temperature of the material 1 while the predetermined distance h between the thermometer 252 and the lower surface of the material 1 is maintained. While the thermometer 252 measures the temperature of the material 1, the displacement sensor 254 measures the distance between the surface of the material 1 and the thermometer 252 in real time. The distance information between the surface of the material 1 and the thermometer 252 measured by the displacement sensor 254 is transmitted to the driving control section 258 in real time.

The driving control section 258, which receives in real time the distance information between the surface of the material 1 and the thermometer 252, transmitted from the displacement sensor 254, controls the operation of the driving member 212 and maintains the predetermined distance h between the surface of the material 1 and the thermometer 252.

Through the above-described operation of the foreign substance removing unit 270 and the maintenance of the predetermined distance h between the thermometer 252 and the material 1 by the displacement sensor 254, the thermometer 252 may precisely measure the temperature of the material 1.

Figure 8:
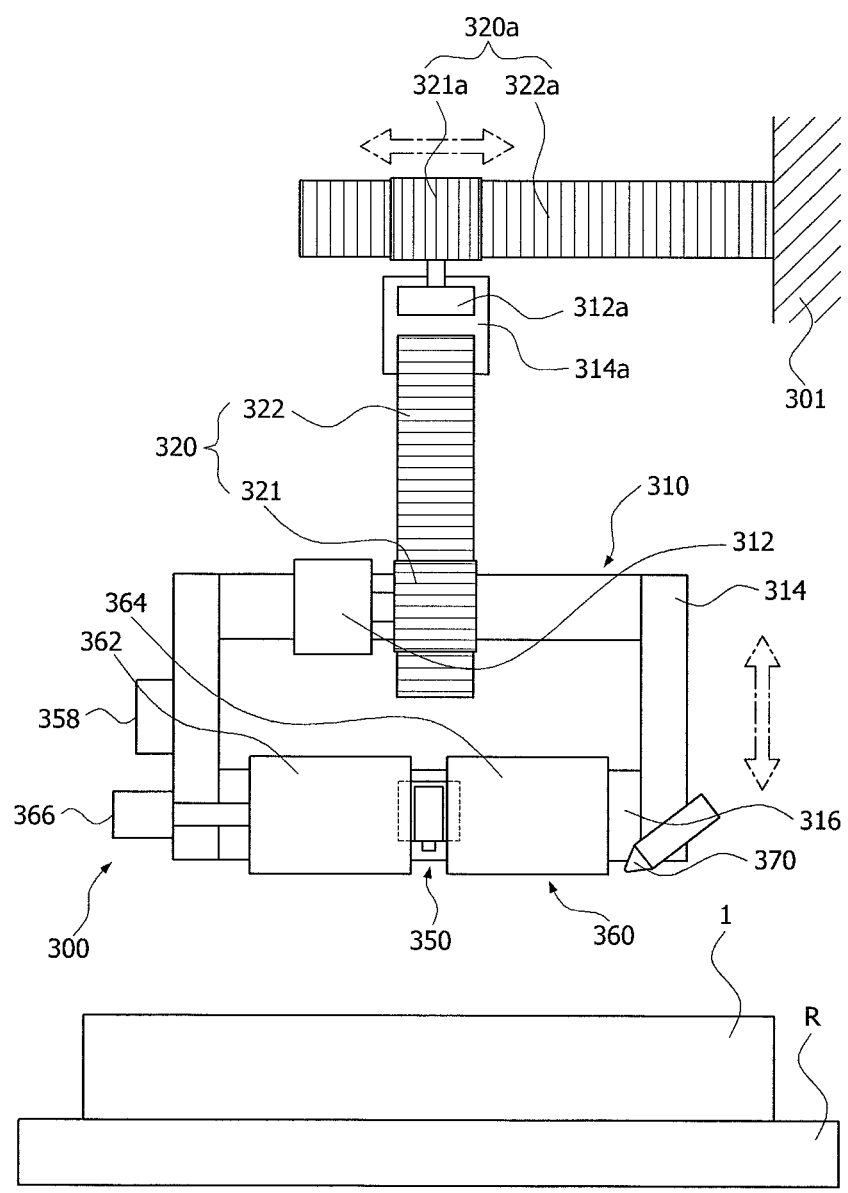
FIG. 8 is a front view of an apparatus for measuring the temperature of a material in accordance with a second embodiment of the present invention.
Figure 9:
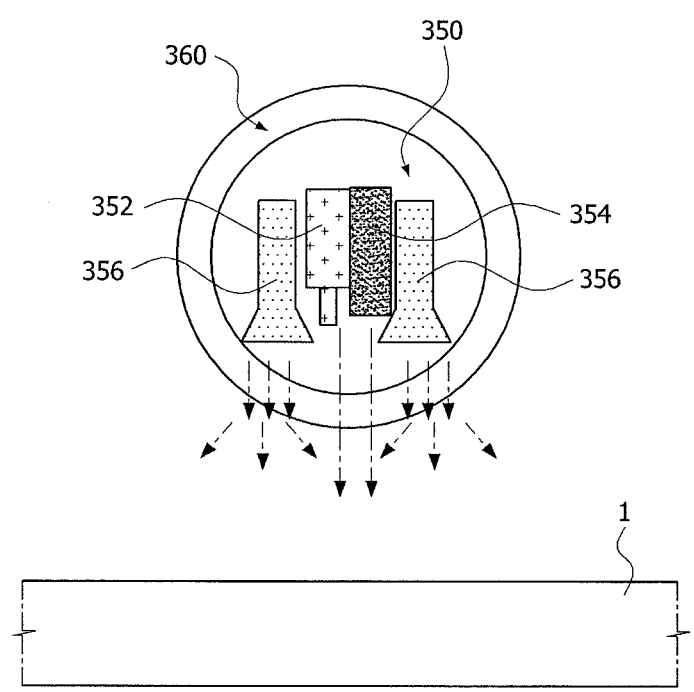
FIG. 9 is a cross-sectional view schematically illustrating the temperature measuring unit of the apparatus for measuring the temperature of a material in accordance with the second embodiment of the present invention.

Referring to FIGS. 8 and 9, an apparatus 300 for measuring the temperature of a material in accordance with a second embodiment of the present invention is disposed on the exit side of a heating furnace and measures the temperature of a material 1 which is extracted from the heating furnace.

The apparatus 300 for measuring the temperature of a material is placed adjacent to the material 1 which is transferred to a roughing mill for performing a post process, by a roller table R. The apparatus 300 for measuring the temperature of a material includes a body unit 310, a temperature measuring unit 350, a protection unit 360, and a foreign substance removing unit 370.

The body unit 310 is installed to be capable of being moved forward and rearward and upward and downward, and includes a first driving member 312, a frame member 314 and a fixed member 316.

The first driving member 312 includes a motor which generates power for moving the body unit 310 upward and downward, and is mounted to the frame member 314.

The fixed member 316 is fixed to the frame member 314. The fixed member 316 is mounted to the distal ends of the side frames of the frame member 314 to extend in the horizontal direction. The temperature measuring unit 350 and the foreign substance removing unit 370 are installed on the fixed member 316.

The apparatus 300 for measuring the temperature of a material further includes moving units 320 and 320*a* for moving the body unit 310 forward, rearward, upward and downward. The moving units 320 and 320a include an upward and downward moving unit 320 which has a first rotation gear part 321 and a first rack gear part 322 and a forward and rearward moving unit 320a which has a second rotation gear part 321a and a second rack gear part 322a.

In the upward and downward moving unit 320, the first rotation gear part 321 is installed to be connected with the first driving member 312 and is rotated by receiving power from the first driving member 312. One end of the first rack gear part 322 is coupled to a support plate 314a, and the other end of the first rack gear part 322 meshes with the first rotation gear part 321 to guide the movement of the first rotation gear part 321.

In the present embodiment, the first rack gear part 322 is exemplified as extending in the vertical direction and providing the vertical movement path of the first rotation gear part 321. The first rotation gear part 321 rotated by receiving power from the first driving member 312 meshes with the first rack gear part 322 and moves in the vertical direction. The body unit 310 is moved in the vertical direction by such movement of the first rotation gear part 321.

In the forward and rearward moving unit 320a, the second rotation gear part 321a is installed to be connected with a second driving member 312a and is rotated by receiving power from the second driving member 312a. The second driving member 312a is installed on the support plate 314a one end of which is coupled with the first rack gear part 322.

The second rack gear part 322a is coupled to an external device 301 and meshes with the second rotation gear part 321a to guide the movement of the second rotation gear part 321a. Since the external device 301 is to fasten the second rack gear part 322a, the external device 301 may of course be replaced with a roller table R, etc. so long as the second rack gear part 322a may be fastened.

In the present embodiment, the second rack gear part 322a is exemplified as extending in the horizontal direction parallel to the roller table R and providing the horizontal movement path of the second rotation gear part 321a. The second rotation gear part 321a rotated by receiving power from the second driving member 312a meshes with the second rack gear part 322a and moves in the horizontal direction. The body unit 310 is moved in the horizontal direction by such movement of the second rotation gear part 321a.

Meanwhile, although it is illustrated in the present embodiment that the second driving member 312a connected with the second rotation gear part 321a is installed on the support plate 314a and the second rack gear part 322a is fastened to the external device 301, it is to be noted that the present invention is not limited to such a structure. In other words, it is conceivable that the second driving member 312a having the second rotation gear part 321a installed thereon may be fastened to the external device 301 and the second rack gear part 322a may be installed on the support plate 314a, so that a variety of modifications for forward and rearward movement of the body unit 310 may be contemplated.

The temperature measuring unit 350 is installed on the body unit 310. In detail, the temperature measuring unit 350 is installed on the fixed member 316 and functions to measure the temperature of the material 1, and includes a thermometer 352, a displacement sensor 354 and foreign substance blocking sections 356.

The thermometer 352 measures the temperature of the material 1. In the present embodiment, the thermometer 352 is exemplified as a pyrometer. The displacement sensor 354 senses the distance between the thermometer 352 and the material 1. In the present embodiment, the displacement sensor 354 is exemplified as a laser displacement sensor.

The foreign substance blocking sections 356 function to inject a fluid with a high pressure under the temperature measuring unit 350 so as to prevent the foreign substances adhered to the material 1 and removed by the foreign substance removing unit 370 from entering the temperature measuring unit 350, specifically, the thermometer 352 and the displacement sensor 354. Due to this fact, the operation precisions of the thermometer 352 and the displacement sensor 354 may be improved. In the present embodiment, the fluid injected by the foreign substance blocking sections 356 is exemplified as air.

Figure 12:
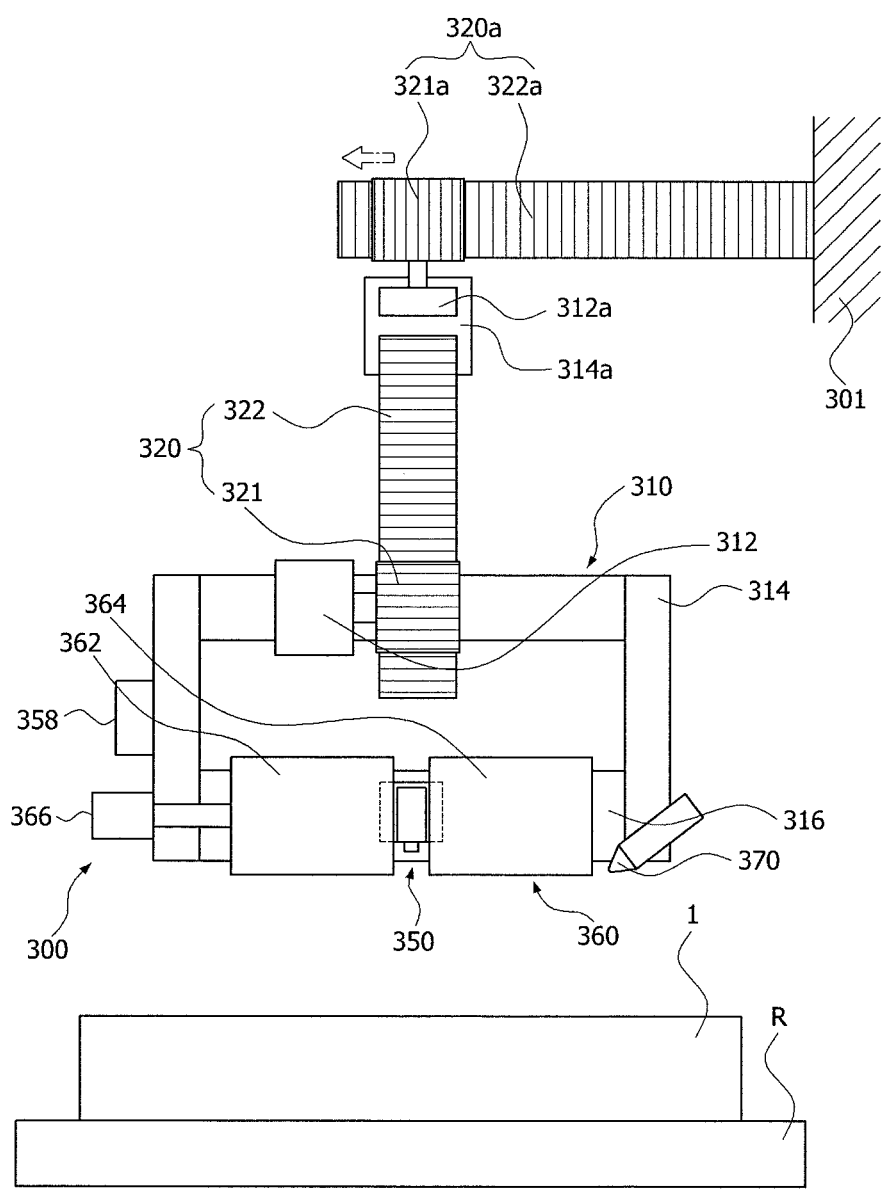
FIG. 12 is a view illustrating a state in which the temperature measuring unit of the apparatus for measuring the temperature of a material in accordance with the second embodiment of the present invention is moved toward the center portion of a material.

The temperature measuring unit 350 further includes a driving control section 358 for controlling the operations of the first driving member 312 and the second driving member 312a. The second driving member 312a provides a rotation driving force to the second rotation gear part 321a such that the second rotation gear part 321a is moved in the horizontal direction on the second rack gear part 322a. The driving control section 358 controls the rotation driving force of the second rotation gear part 321a provided from the second driving member 312a, and places the second rotation gear part 321a at a target position on the second rack gear part 322a (see FIG. 12).

Figure 13:
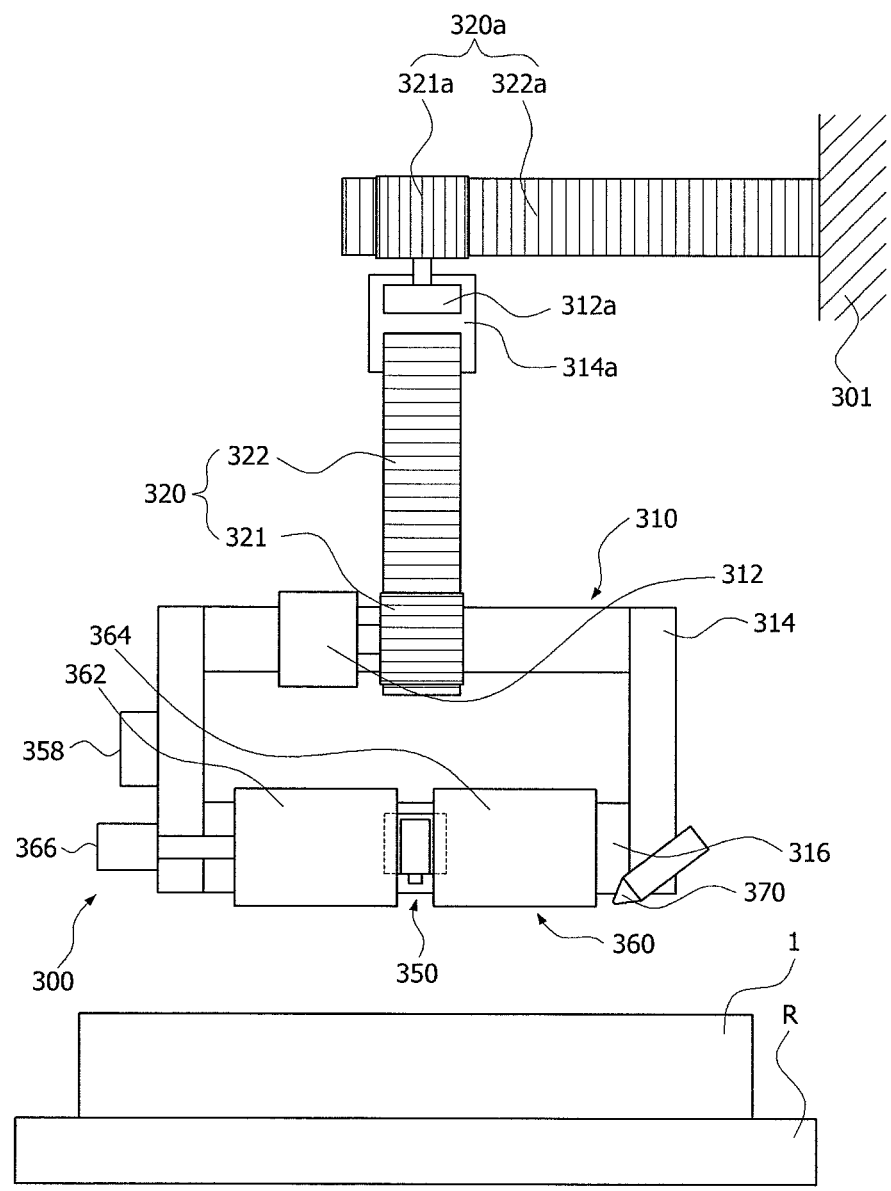
FIG. 13 is a view illustrating a state in which the temperature measuring unit of the apparatus for measuring the temperature of a material in accordance with the second embodiment of the present invention is moved downward.
Figure 14:
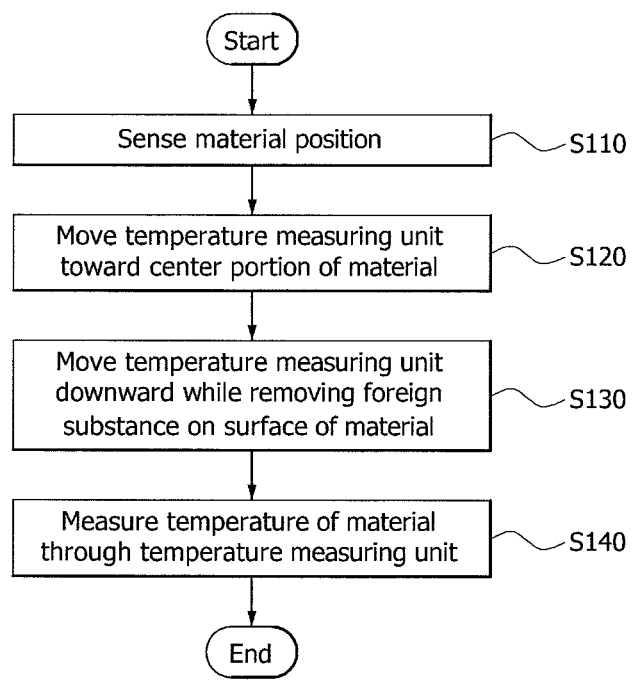
FIG. 14 is a flow chart explaining a method for measuring the temperature of a material by using the apparatus for measuring the temperature of a material in accordance with the second embodiment of the present invention.

Also, the driving control section 358 is connected with the displacement sensor 354 and controls the operation of the first driving member 312a. The distance information between the surface of the material 1 and the thermometer 352 measured by the displacement sensor 354 is transmitted to the driving control section 358 in real time. The driving control section 358, which receives in real time the distance information between the surface of the material 1 and the thermometer 352 from the displacement sensor 354, controls the operation of the first driving member 312a until the distance between the upper surface of the material 1 and the thermometer 352 approaches a predetermined distance. That is to say, in the case where the distance between the surface of the material 1 and the thermometer 352 approaches the predetermined distance, the driving control section 358 interrupts the operation of the first driving member 312a so that the distance between the surface of the material 1 and the thermometer 352 may be maintained as the predetermined distance (see FIG. 13).

The apparatus 300 for measuring the temperature of a material includes the foreign substance removing unit 370. The foreign substance removing unit 370 is installed on the body unit 310, specifically, the fixed member 316, and injects a fluid with a high pressure toward the material 1 before the temperature of the material 1 is measured, to remove foreign substances such as scale produced on the upper surface of the material 1. By this fact, it is possible to suppress an error from occurring between an actual value and a measured value in the temperature of the material 1 due to the presence of the foreign substances adhered to the upper surface of the material 1.

The apparatus 300 for measuring the temperature of a material includes the protection unit 360. The protection unit 360 is formed into a roller-like shape and is rotatably installed on the body unit 310. The protection unit 360 protects the temperature measuring unit 350, and includes protection members 362 and 364 and an opening and closing member 366.

The protection members 362 and 364 are rotatably installed on the fixed member 316. In the present embodiment, the respective protection members 362 and 364 are exemplified as being divided into a first protection member 362 and a second protection member 364. The first protection member 362 and the second protection member 364 are installed to be rotatable about the fixed member 316.

According to the present embodiment, the protection members 362 and 364 are formed in such a manner that the distance between the outer surfaces of the protection members 362 and 364 and the material 1 is shorter than the distance between the distal end of the temperature measuring unit 350 and the material 1. Namely, the protection members 362 and 364 are formed to project more than the temperature measuring unit 350 toward the material 1.

Accordingly, in the event that an optional object is abruptly directed toward the temperature measuring unit 350, the protection members 362 and 364 are first brought into contact with the object to prevent the occurrence of collision between the object and the temperature measuring unit 350, whereby it is possible to prevent the temperature measuring unit 350 from being broken by the optional object.

Figure 10:
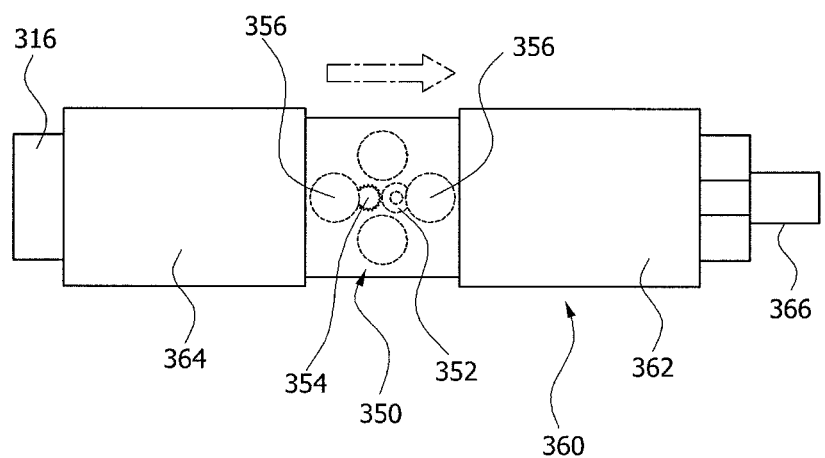
FIGS. 10 and 11 are views illustrating operating states of the protection unit of the apparatus for measuring the temperature of a material in accordance with the second embodiment of the present invention.
Figure 11:
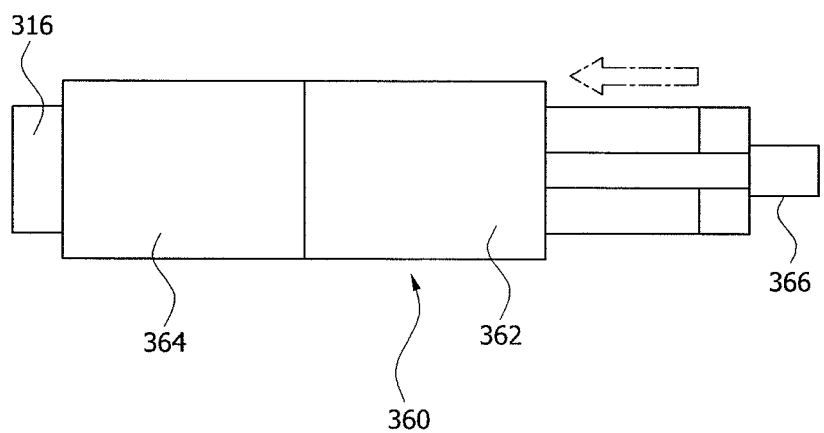

Referring to FIGS. 10 and 11, as the protection members 362 and 364 slide leftward and rightward, they expose the temperature measuring unit 350 to an outside or prevent the exposure of the temperature measuring unit 350 to the outside. When the first protection member 362 and the second protection member 364 are brought into contact with each other, the temperature measuring unit 350 is prevented from being exposed to the outside (see FIG. 11), and when the first protection member 362 is slidingly moved in the direction facing away from the second protection member 364, the temperature measuring unit 350 is exposed toward the material 1 in the space between the first protection member 362 and the second protection member 364 (see FIG. 10).

The opening and closing member 366 drives the first protection member 362 under the control of the driving control section 358 and selectively exposes the temperature measuring unit 350 to the outside. According to the present embodiment, the opening and closing member 366 includes a hydraulic cylinder which is connected with the first protection member 362. The opening and closing member 366 selectively exposes the temperature measuring unit 350 to the outside, by moving the first protection member 362 in the direction facing the second protection member 364 or in the direction facing away from the second protection member 364, using the power generated by the hydraulic cylinder.

While it is exemplified in the present embodiment that the opening and closing member 366 is connected with and moves the first protection member 362, it is to be noted that the present invention is not limited to such. That is to say, the opening and closing member 366 may selectively expose the temperature measuring unit 350 to the outside by being connected with and moving the second protection member 364, or may selectively expose the temperature measuring unit 350 to the outside by being connected with and moving both the first protection member 362 and the second protection member 364, so that a variety of modifications may be contemplated.

The protection unit 360, which selectively exposes the temperatures measuring unit 350 to the outside, protects the temperature measuring unit 350 from foreign substances such as dust or the like. In other words, when the temperature measuring unit 350 does not operate, the protection unit 360 prevents the temperature measuring unit 350 from being exposed to the outside so that it is possible to prevent foreign substances such as dust from entering the temperature measuring unit 350.

When the temperature measuring unit 350 operates, the protection unit 360 allows the temperature measuring unit 350 to be exposed toward the material 1 such that the temperature measuring unit 350 can perform the operation of measuring the temperature of the material 1.

Hereafter, a method for measuring the temperature of a material using the apparatus 300 for measuring the temperature of a material in accordance with the second embodiment of the present invention will be described with reference to FIGS. 8 to 14.

In order to measure the temperature of the material 1, the position of the material 1 which is transferred from a heating furnace is sensed (S110). After being extracted from the heating furnace, the material 1 is transferred onto the roller table R by an extractor. The apparatus 300 for measuring the temperature of a material is disposed on the exit side of the heating furnace, and if entrance of the material 1 to the extractor is sensed, an operation for measuring a temperature is started.

When the sensed material 1 is transferred to a predetermined position, that is, when the material 1 is placed on the extractor in the embodiment of the present invention, the temperature measuring unit 350 is moved toward the center portion of the material (S120). The temperature measuring unit 350 is moved toward the material 1 parallel to the material 1 until the temperature measuring unit 350 reaches above the center portion of the material 1. The reason why the temperature measuring unit 350 is positioned over the center portion of the material 1 resides in that, as an area through which the material 1 is brought into contact with outside air increases toward the ends of the material 1, the temperature of the material 1 gradually decreases and thus it is difficult to set the temperature of the material 1 at the peripheral portion of the material 1 as the representative temperature of the material 1.

According to the present embodiment, the movement of the temperature measuring unit 250 toward the center portion of the material 1 is implemented through the operation of the second driving member 312a. That is to say, if the extractor senses the entrance of the material 1 and transmits a signal to the driving control section 358, the driving control section 358 controls the operation of the second driving member 312a such that the body unit 310 is moved forward or rearward to allow the temperature measuring unit 350 to reach above the center portion of the material 1. That is to say, the temperature measuring unit 350 is moved to above the center portion of the material 1 by the body unit 310 moved in this way. When the temperature measuring unit 350 reaches above the center portion of the material 1, the movement of the body unit 310 is stopped under the control of the driving control section 358.

At the same time or sequentially after the temperature measuring unit 350 is moved to above the material 1, the driving control section 358 controls the operation of the protection unit 360 and exposes the temperature measuring unit 350 to the outside. In other words, the driving control section 358 controls the operation of the opening and closing member 366 to slide the protection members 362 and 364 such that the temperature measuring unit 350 is exposed to the outside and may perform the operation of measuring the temperature of the material 1.

Also, the driving control section 358 operates the foreign substance removing unit 370, and injects the fluid with a high pressure to the upper surface of the material 1 to remove the foreign substances adhered to the upper surface of the material 1. At this time, the temperature measuring unit 350 is moved downward until the distance between the temperature measuring unit 350 and the upper surface of the material 1 approaches the upper surface of the material 1 (S130).

In the present embodiment, the predetermined distance means a distance through which the foreign substances adhered to the upper surface of the material 1 may be optimally removed by the foreign substance removing unit 370, and may be appropriately controlled depending upon the kind of the material 1.

According to the present embodiment, the downward movement of the temperature measuring unit 350 is implemented by the operation of the driving member 312. That is to say, if the temperature measuring unit 350 reaches above the center portion of the material 1, the driving control section 358 controls the operation of the first driving member 312 and moves downward the body unit 310 toward the material 1. The temperature measuring unit 350 is moved downward by the body unit 310 moved in this way. The downward movement of the body unit 310 is stopped under the control of the driving control section 358 when the temperature measuring unit 350 approaches the predetermined distance.

It is measured by the displacement sensor 354 whether or not the temperature measuring unit 350 approaches the predetermined distance. The distance information between the surface of the material 1 and the temperature measuring unit 350 measured by the displacement sensor 354 is transmitted to the driving control section 358 in real time. When it is determined that the temperature measuring unit 350 has approached the predetermined distance, the driving control section 358 interrupts the operation of the first driving member 312a.

The temperature measuring unit 350 measures the temperature of the material 1 from which the foreign substances are removed by the foreign substance removing unit 370, while the predetermined distance between the upper surface of the material 1 and the temperature measuring unit 350 is maintained (S140).

Through the above-described operation of the foreign substance removing unit 370 and the maintenance of the predetermined distance between the temperature measuring unit 350 and the material 1 by the displacement sensor 354, the temperature measuring unit 350 may precisely measure the temperature of the material 1.

Figure 15:
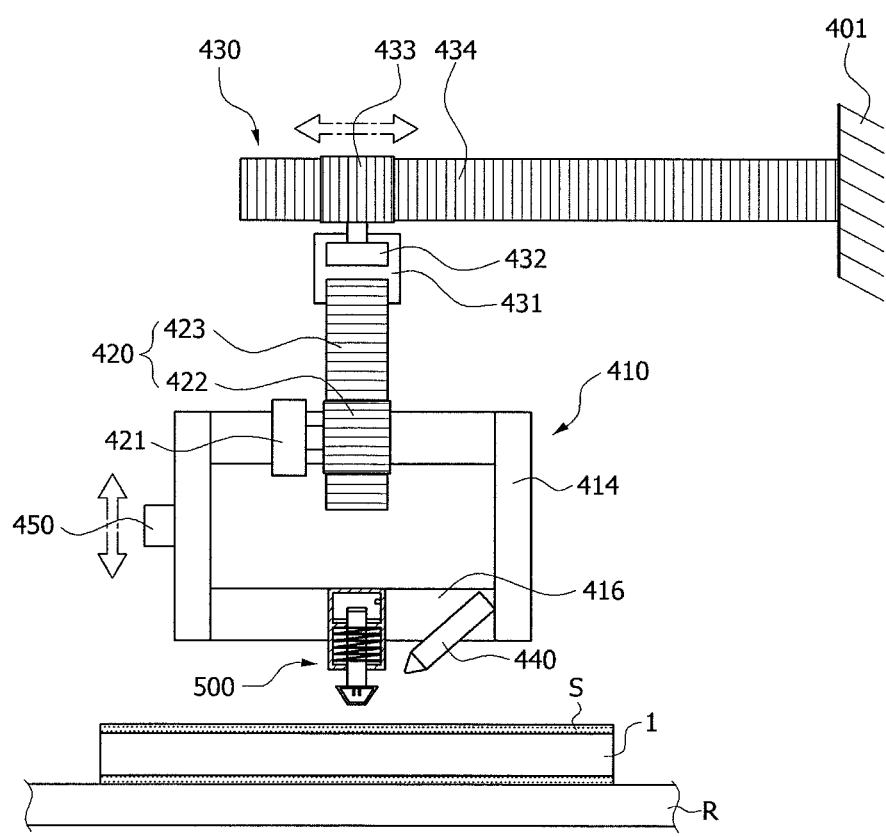
FIG. 15 is a view schematically illustrating an apparatus for measuring the temperature of a material in accordance with a third embodiment of the present invention.

Referring to FIG. 15, an apparatus 400 for measuring the temperature of a material in accordance with a third embodiment of the present invention is disposed on the exit side of a heating furnace and measures the temperature of a material 1 which is extracted from the heating furnace.

The apparatus 400 for measuring the temperature of a material is placed adjacent to the material 1 which is transferred to a roughing mill for performing a post process, by a roller table R. The apparatus 400 for measuring the temperature of a material includes a body unit 410, a temperature measuring unit 500, an upward and downward moving unit 420, a leftward and rightward moving unit 430, a foreign substance removing unit 440, and a driving control unit 450.

The body unit 410 is installed to be capable of being moved not only leftward and rightward but also upward and downward, and includes an upward and downward driving member 421, a frame member 414 and a fixed member 416.

The upward and downward driving member 421 includes a motor which generates power for moving the body unit 410 upward and downward, and is mounted to the frame member 414.

The fixed member 416 is fixed to the frame member 414. The fixed member 416 is mounted to the distal ends of the side frames of the frame member 414 to extend in the horizontal direction. The temperature measuring unit 500 may be installed on the fixed member 416, and the foreign substance removing unit 440 may be installed on the fixed member 416 or the frame member 414.

The apparatus 400 for measuring the temperature of a material further includes moving units 420 and 430 for moving the body unit 410 leftward, rightward, upward and downward. The moving units 420 and 430 include an upward and downward moving unit 420 which has an upward and downward rotation gear part 422 and an upward and downward rack gear part 423 and a leftward and rightward moving unit 430 which has a leftward and rightward rotation gear part 433 and a leftward and rightward rack gear part 434.

In the upward and downward moving unit 420, the upward and downward rotation gear part 422 is connected with the upward and downward driving member 421 and is rotated by receiving power from the upward and downward driving member 421. One end of the upward and downward rack gear part 423 is coupled to a connection plate 431, and the other end of the upward and downward rack gear part 423 meshes with the upward and downward rotation gear part 422 to guide the movement of the upward and downward rotation gear part 422.

In the present embodiment, the upward and downward rack gear part 423 is exemplified as extending in the vertical direction and providing the vertical movement path of the upward and downward rotation gear part 422. The upward and downward rotation gear part 422 rotated by receiving power from the upward and downward driving member 421 meshes with the upward and downward rack gear part 423 and moves in the vertical direction. The body unit 410 is moved in the vertical direction by such movement of the upward and downward rotation gear part 422.

In the leftward and rightward moving unit 430, the leftward and rightward rotation gear part 433 is connected with a leftward and rightward driving member 432 and is rotated by receiving power from the leftward and rightward driving member 432. The leftward and rightward driving member 432 is installed on the connection plate 431 which is coupled with the upward and downward rack gear part 423.

The leftward and rightward rack gear part 434 is coupled to an external device 401 and meshes with the leftward and rightward rotation gear part 433 to guide the movement of the leftward and rightward rotation gear part 433. Since the external device 401 is to fasten the leftward and rightward rack gear part 434, the external device 401 may of course be replaced with a wall surface or a roller table R, etc. so long as the leftward and rightward rack gear part 434 may be fastened.

In the present embodiment, the leftward and rightward rack gear part 434 is exemplified as extending parallel to the roller table R and providing the horizontal movement path of the leftward and rightward rotation gear part 433. The leftward and rightward rotation gear part 433 rotated by receiving power from the leftward and rightward driving member 432 meshes with the leftward and rightward rack gear part 434 and moves in the horizontal direction. The body unit 410 is moved in the horizontal direction by such movement of the leftward and rightward rotation gear part 433.

Although it is illustrated in the present embodiment that the leftward and rightward driving member 432 connected with the leftward and rightward rotation gear part 433 is installed on the connection plate 431 and the leftward and rightward rack gear part 434 is fastened to the external device 401, it is to be noted that the present invention is not limited to such a structure.

In other words, it is conceivable that the leftward and rightward driving member 432 having the leftward and rightward rotation gear part 433 installed thereon may be fastened to the external device 401 and the leftward and rightward rack gear part 434 may be installed on the connection plate 431, so that a variety of modifications for forward and rearward movement of the body unit 410 may be contemplated.

Figure 16:
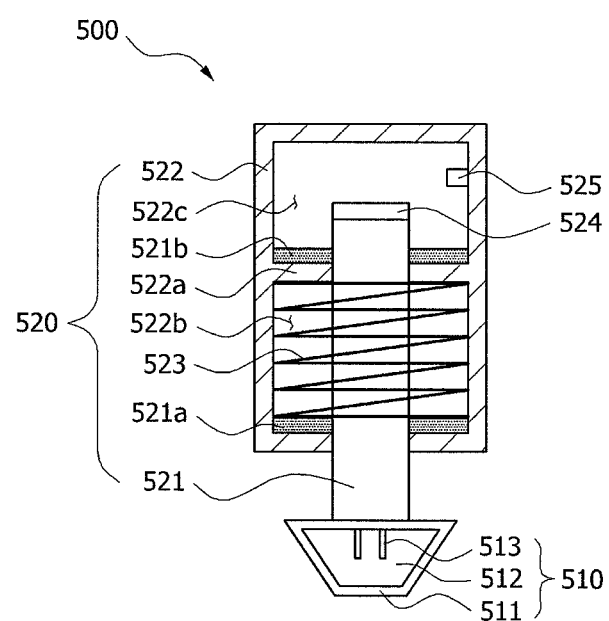
FIG. 16 is a view schematically illustrating the temperature measuring unit of the apparatus for measuring the temperature of a material in accordance with the third embodiment of the present invention.

Referring to FIGS. 15 and 16, the temperature measuring unit 500 is installed on the body unit 410, and measures the temperature of the material 1 by being brought into direct contact with the upper surface of the material 1 which is extracted from the heating furnace and is placed on the roller table R. In detail, the temperature measuring unit 500 is installed on the fixed member 416, and includes a temperature measuring section 510 and a contact sensing section 520.

Figure 20:
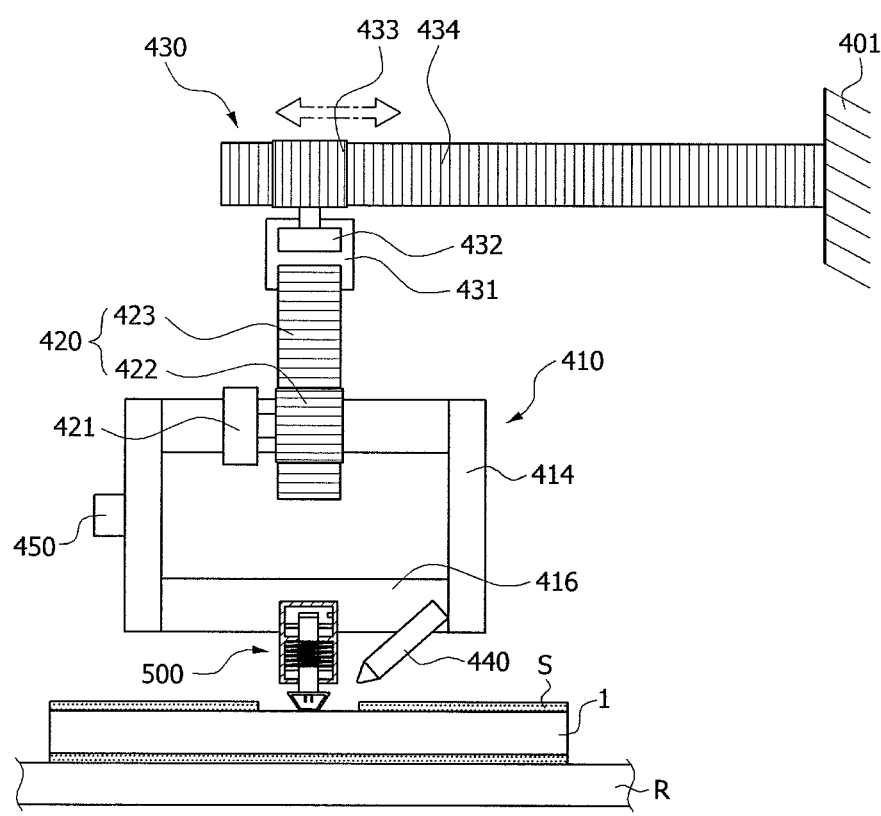
FIG. 20 is a view illustrating a state in which the temperature measuring unit of the apparatus for measuring the temperature of a material in accordance with the third embodiment of the present invention is brought into contact with a material.

Referring to FIGS. 16 and 20, the temperature measuring section 510 includes a contact part 511, a heat conductive part 512 and a thermocouple 513. The temperature measuring section 510 measures the temperature of the material 1 by being brought into contact with the upper surface of the material 1.

The contact part 511 is brought into contact with the upper surface of the material 1 by the downward movement of the body unit 410. Since the contact part 511 is a part which is brought into contact with the material 1 with a high temperature, the contact part 511 may be constructed to include a material such as cemented carbide with high hardness and high heat conductivity.

The thermocouple 513 is built in the contact part 511. The thermocouple 513 is an element which is formed by joining two kinds of metals to be capable of measuring a wide range of temperature using a Seebeck effect. When one contact point is set as a reference point and the other contact point is placed on a portion to be measured, a temperature difference may be known by the magnitude of an electromotive force, and a temperature is measured by comparing the temperature difference with the temperature of the reference point.

In the present embodiment, the thermocouple 513 has a shape in which a contact is connected to a protective envelope made of a metal, and is exemplified as a ground type thermocouple which has a good responding speed and may be used in a high temperature and high pressure condition. Since the structure and function of the thermocouple 513 are well known to those skilled in the art, detailed description thereof will be omitted herein.

The heat conductive part 512 is provided in the contact part 511 and transfers the heat of the material 1 transferred to the contact part 511 to the thermocouple 513. The heat conductive part 512 may be constructed to include a material, such as gold, silver and aluminum, with high heat conductivity.

The contact sensing section 520 includes a support part 521, a housing 522, an elastic member 523, a metal element 524, and a sensor part 525. The contact sensing section 520 is connected with the temperature measuring section 510 and senses whether or not the temperature measuring section 510 is brought into contact with the material 1.

The support part 521 is connected to the upper surface of the contact part 511. In the present embodiment, the support part 521 is formed to have a circular cylinder-like shape. A first stopper 521a and a second stopper 521b are fastened to the circumferential outer surface of the support part 521.

The first stopper 521a is fastened to the lower portion of the support part 521 and is disposed in a lower space 522b which is defined in the housing 522 by a partition wall 522a. The outer diameter of the first stopper 521a is larger than the diameter of an insertion hole which is defined through the bottom wall of the housing 522 to allow the support part 521 to be inserted therethrough, by which the support part 521 is prevented from being released from the housing 522. Since the outer diameter of the first stopper 521a corresponds to the inner diameter of the housing 522 which defines the lower space 522b, the support part 521 may be moved upward and downward through the housing 522 without fluctuation.

Figure 21:
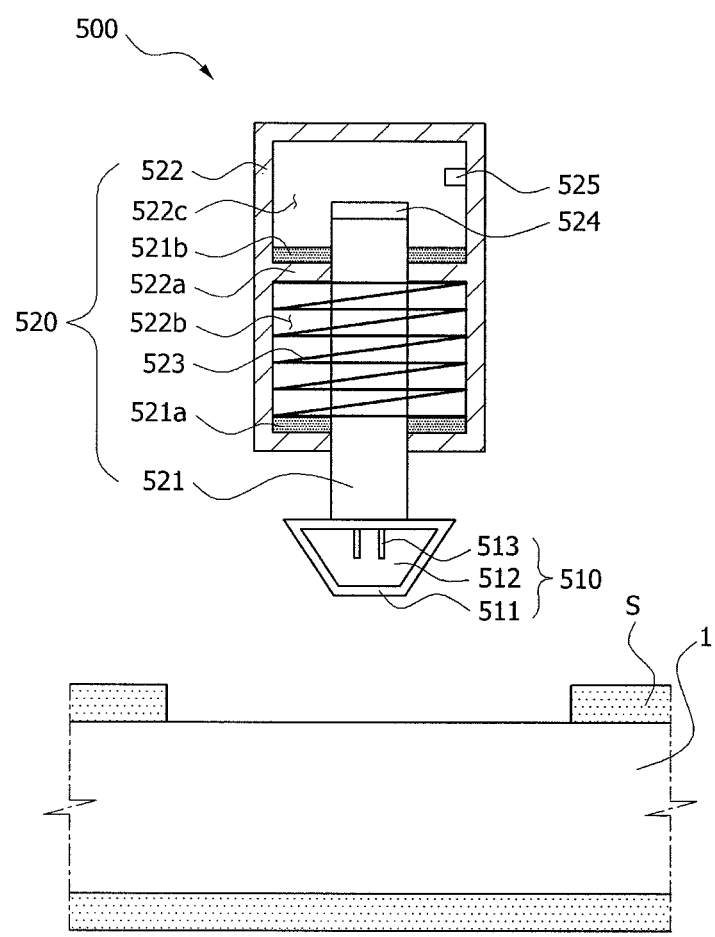
FIG. 21 is a view illustrating a state in which the temperature measuring section of the apparatus for measuring the temperature of a material in accordance with the third embodiment of the present invention is moved downward.
Figure 22:
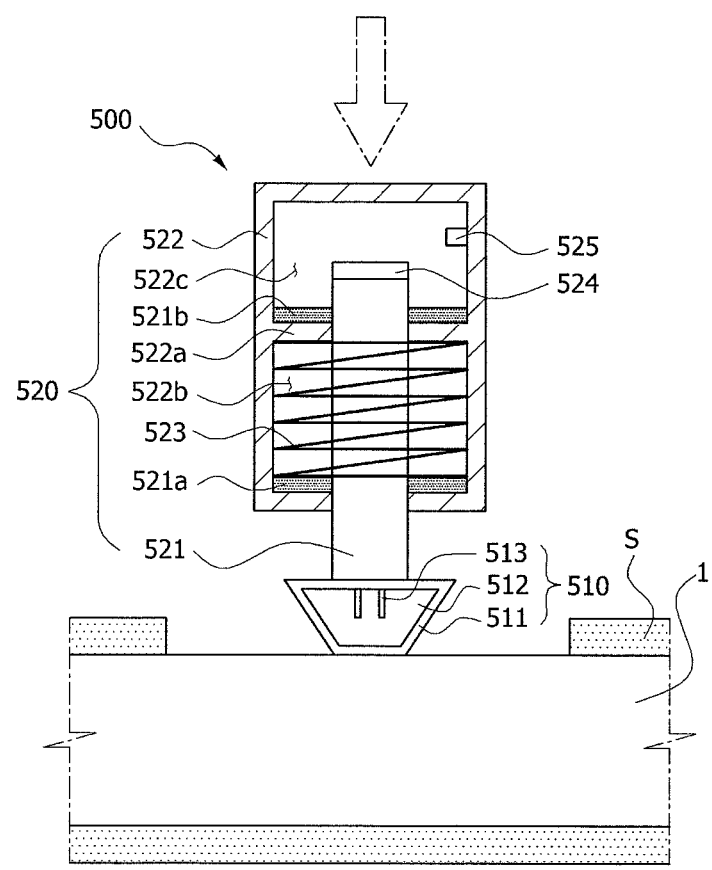
FIG. 22 is a view illustrating a state in which the temperature measuring section of the apparatus for measuring the temperature of a material in accordance with the third embodiment of the present invention is brought into contact with the material.
Figure 23:
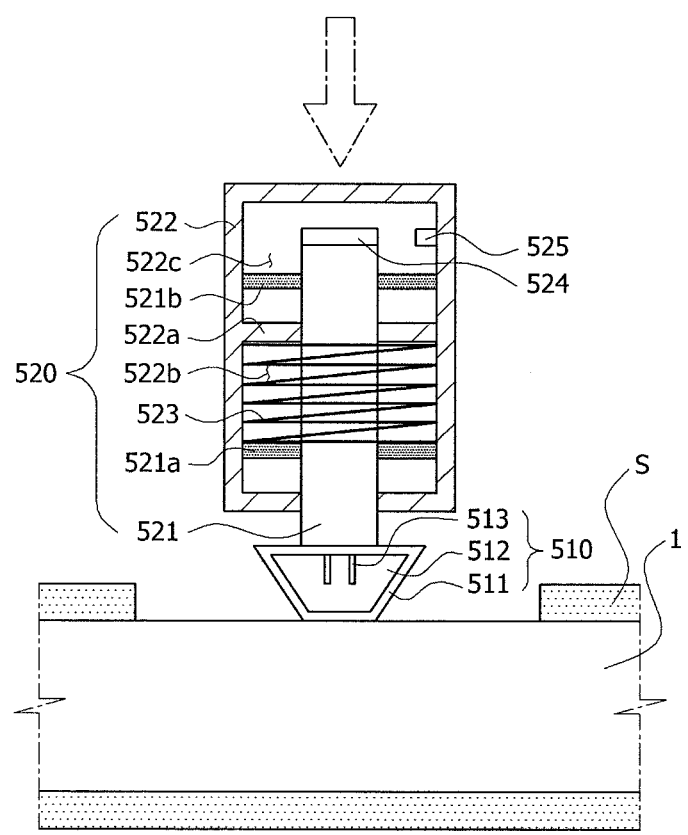
FIG. 23 is a view illustrating a state in which the supporting section of the apparatus for measuring the temperature of a material in accordance with the third embodiment of the present invention is moved toward a housing.

Referring to FIGS. 21 to 23, the first stopper 521a prevents the support part 521 from being excessively moved downward to be released from the housing 522, when the support part 521 moved upward through the housing 522 is moved downward by the returning force of the elastic member 523. In other words, the downward movement of the support part 521, which is returned toward an original position by the elastic member 523, is stopped when the first stopper 521a contacts the bottom of the lower space 522b.

The second stopper 521b is fastened to the upper portion of the support part 521 and is disposed in an upper space 522c which is defined in the housing 522 by the partition wall 522a. The outer diameter of the first stopper 521b corresponds to the inner diameter of the housing 522 which defines the upper space 522c. Therefore, the support part 521 may be moved upward and downward through the housing 522 without fluctuation by the presence of the first stopper 521a and the second stopper 521b.

The second stopper 521b prevents the support part 521 from being excessively moved downward to be released from the housing 522, when the support part 521 moved upward through the housing 522 is moved downward by the returning force of the elastic member 523. In other words, the downward movement of the support part 521, which is returned toward the original position by the elastic member 523, is stopped when the second stopper 521b contacts the upper surface of the partition wall 522a.

The housing 522 has a hollow shape such that the support 521 can be moved into and out of the housing 522. In the present embodiment, the housing 522 is formed to have a hollow cylindrical shape. The internal space of the housing 522 is divided into the lower space 522b and the upper surface 522c by the partition wall 522a.

The first stopper 521a is disposed in the lower space 522b, and the second stopper 521b is disposed in the upper space 522c. A through hole is defined in the partition wall 522a such that the support part 521 can pass through the through hole.

As described above, since the inner diameter of the housing 522 which defines the lower space 522b is the same as the outer diameter of the first stopper 521a and the inner diameter of the housing 522 which defines the upper space 522c is the same as the outer diameter of the second stopper 521b, the support part 521 may be moved upward and downward in the housing 522 without fluctuation.

The elastic member 523 has one end which is connected to the upper surface of the first stopper 521a and the other end which is connected to the lower surface of the partition wall 522a. According to this fact, the support part 521 which is moved upward as the contact part 511 is brought into contact with the material 1 is moved downward by the elastic member 523 when the contact between the contact part 511 and the material 1 is released.

Namely, when the contact between the contact part 511 and the material 1 is released so an external force applied to the contact part 511 and the support part 521 is removed, the elastic member 523 provides a returning force for moving the support part 521 downward. In the present embodiment, the elastic member 523 includes a coil spring and is exemplified as surrounding the support part 521.

The metal element 524 is secured to the upper end of the support part 521 and is positioned lower than the sensor part 525 which is provided in the housing 522. The sensor part 525 senses the metal element 524 when the metal element 524 reaches the same height as the sensor part 525 as the support part 521 is moved upward, and transmits a sensed signal to the driving control unit 450.

Figure 24:
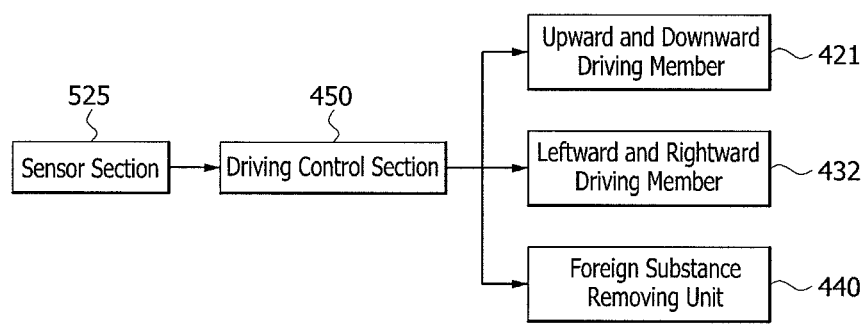
FIG. 24 is a configuration diagram showing the control flow of the apparatus for measuring the temperature of a material in accordance with the third embodiment of the present invention.

Referring to FIGS. 15 and 24, the driving control unit 450 controls the operations of the upward and downward driving member 421 and controls the leftward and rightward driving member 432. The leftward and rightward driving member 432 provides a rotation driving force to the leftward and rightward rotation gear part 433 such that the leftward and rightward rotation gear part 433 may be moved leftward and rightward on the leftward and rightward rack gear part 434.

Figure 17:
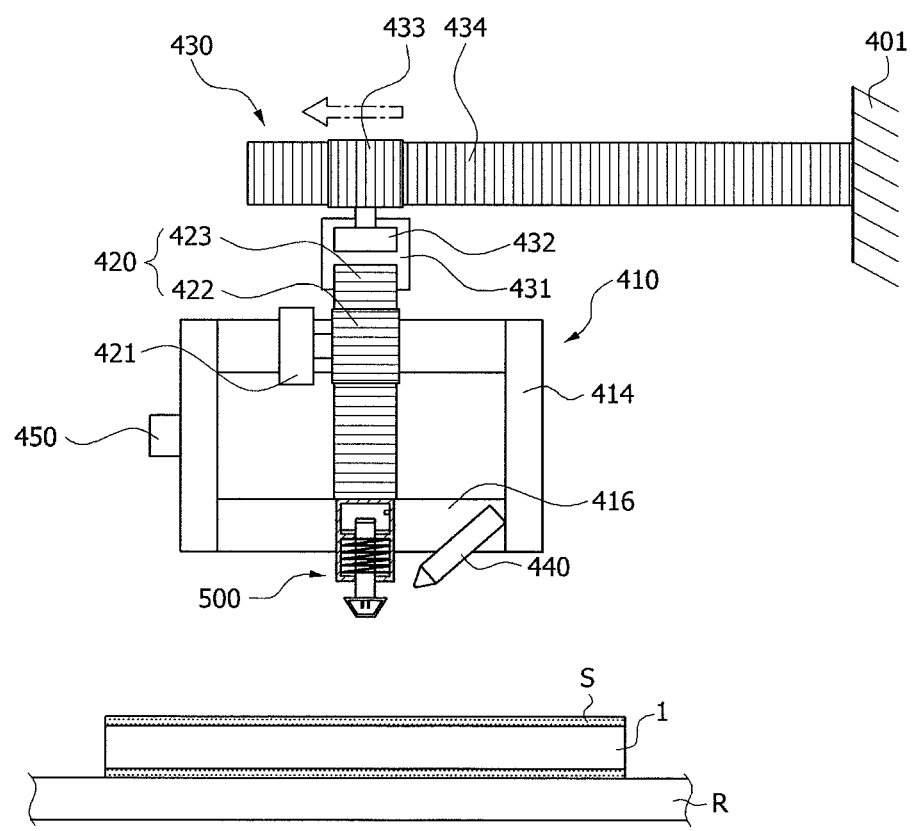
FIG. 17 is a view illustrating a state in which the apparatus for measuring the temperature of a material in accordance with the third embodiment of the present invention is moved leftward.
Figure 18:
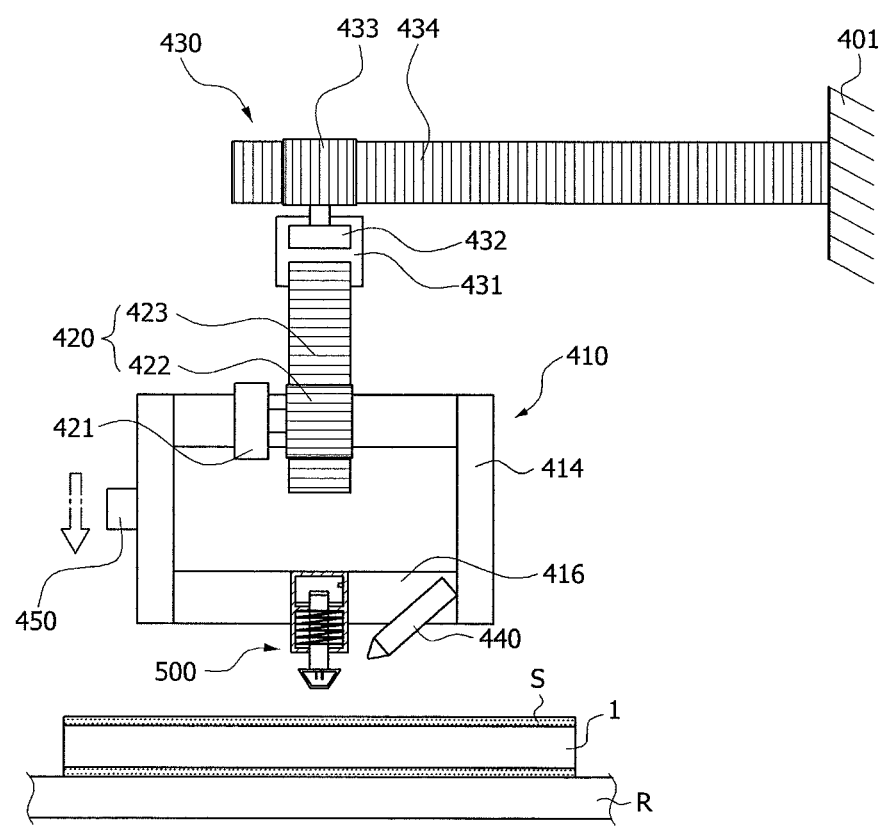
FIG. 18 is a view illustrating a state in which the apparatus for measuring the temperature of a material in accordance with the third embodiment of the present invention is moved downward.

The driving control unit 450 controls the rotation driving force of the leftward and rightward rotation gear part 433 that is provided from the leftward and rightward driving member 432, to place the leftward and rightward rotation gear part 433 at a target position on the leftward and rightward rack gear part 434 (see FIG. 17).

The driving control unit 450 is connected with the sensor part 525 and controls the operation of the upward and downward driving member 521. When the sensor part 525 senses that the metal element 524 reaches the same height as the sensor part 525, the sensor part 525 transmits an arrival signal to the driving control unit 450 in real time (see FIG. 23).

The driving control unit 450 interrupts the operation of the upward and downward driving member 421 on the basis of the received arrival signal to prevent the body unit 410 from being further moved downward. According to this fact, the support part 521 is not moved upward any more.

Referring to FIGS. 21 to 23, the sensor part 525 is provided in the upper space 522c of the housing 522. The sensor part 525 includes a limit sensor, and when the metal element 524 is moved upward to the same height as the sensor part 525, the sensor part 525 senses this and transmits the arrival signal to the driving control unit 450.

Figure 19:
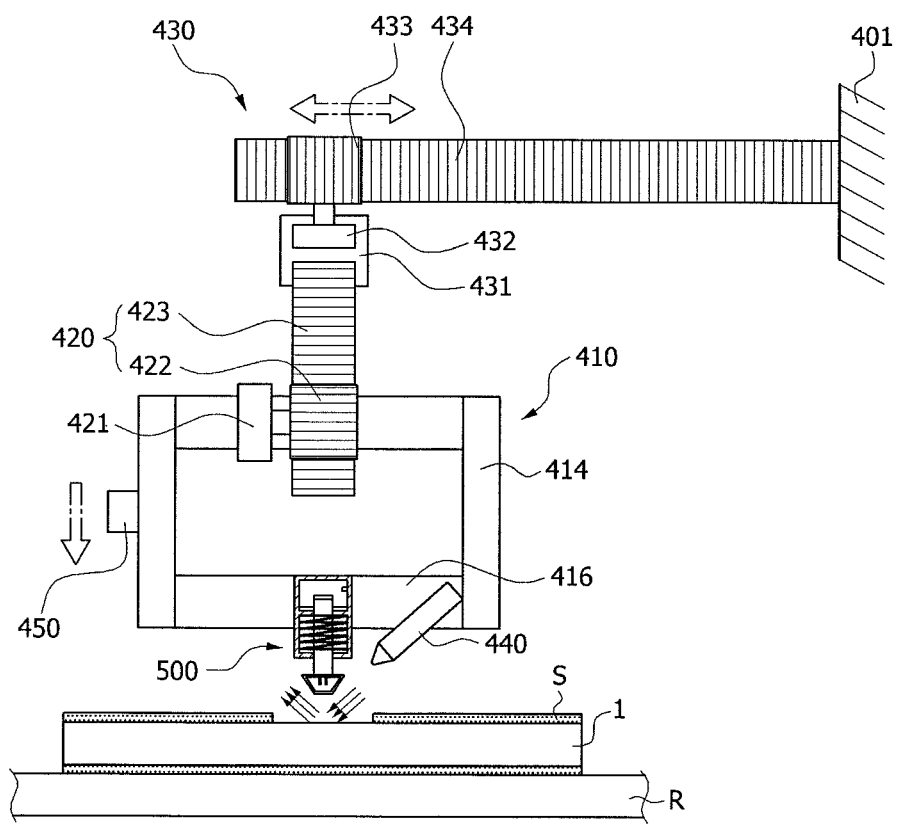
FIG. 19 is a view illustrating a state in which the foreign substance removing unit of the apparatus for measuring the temperature of a material in accordance with the third embodiment of the present invention operates.

Referring to FIGS. 15 and 19, the foreign substance removing unit 440 is installed on fixed member 416 or the frame member 414, and injects a fluid with a high pressure toward the upper surface of the material 1 to remove the foreign substances formed on the upper surface of the material 1.

In the present embodiment, the foreign substance removing unit 440 injects the fluid below the temperature measuring unit 500 at a time when the temperature measuring unit 500 is moved downward by the downward movement of the body unit 410.

Before the temperature measuring unit 500 reaches the upper surface of the material 1, foreign substances S formed on the upper surface of the material 1 are removed by the foreign substance removing unit 440. Since the temperature of the material 1 is measured by bringing the temperature measuring unit 500 into direct contact with the upper surface of the material 1 with the foreign substances S removed in this way, it is possible to suppress an error from occurring between an actual value and a measured value in the temperature of the material 1 due to the presence of the foreign substances S.

Hereafter, a method for measuring the temperature of a material using the apparatus 400 for measuring the temperature of a material in accordance with the third embodiment of the present invention will be described with reference to FIGS. 15 to 25.

In order to measure the temperature of the material 1, the position of the material 1 which is transferred from a heating furnace is sensed (S210). After being extracted from the heating furnace, the material 1 is transferred onto the roller table R by an extractor (not shown). The apparatus 400 for measuring the temperature of a material is disposed on the exit side of the heating furnace, and if the material 1 is placed on the roller table R by the extractor, an operation for measuring a temperature is started (see FIG. 15).

When the material 1 is placed on the roller table R, the temperature measuring unit 500 is moved toward above the center portion of the material 1 (S220) (see FIG. 17). The temperature measuring unit 500 is moved parallel to the material 1 until the temperature measuring unit 500 reaches above the center portion of the material 1.

The reason why the temperature measuring unit 500 is positioned over the center portion of the material 1 resides in that, as an area through which the material 1 is brought into contact with outside air increases toward the ends of the material 1, the temperature of the material 1 gradually decreases and thus it is difficult to set the temperature of the material 1 at the peripheral portion of the material 1 as the representative temperature of the material 1.

The movement of the temperature measuring unit 500 toward above the center portion of the material 1 is implemented through the operation of the leftward and rightward driving member 432 (see FIGS. 15 and 24). If the roller table R senses the placement of the material 1 and transmits a corresponding signal to the driving control unit 450, the driving control unit 450 controls the operation of the leftward and rightward driving member 432 such that the body unit 310 is moved leftward or rightward to allow the temperature measuring unit 500 to reach above the center portion of the material 1.

The temperature measuring unit 500 is moved to above the center portion of the material 1 by the body unit 410. When the temperature measuring unit 500 reaches above the center portion of the material 1, the driving control unit 450 interrupts the operation of the leftward and rightward driving member 432 and the leftward and rightward movement of the body unit 410 is stopped.

When the temperature measuring unit 500 reaches above the center portion of the material 1, the driving control unit 450 operates the foreign substance removing unit 440 (see FIGS. 15 and 24). According to this fact, the foreign substance removing unit 440 injects the fluid at a high pressure to the upper surface of the material 1 and removes the foreign substances S which are formed on the upper surface of the material 1 (S230) (see FIG. 19).

The downward movement of the temperature measuring unit 500 is implemented by the operation of the upward and downward driving member 421. That is to say, if the temperature measuring unit 500 reaches above the center portion of the material 1, the driving control unit 450 controls the operation of the upward and downward driving member 421 and moves downward the body unit 410 toward the material 1. Due to this fact, the temperature measuring unit 500 is brought into contact with the upper surface of the material 1 removed with the foreign substances S by the foreign substance removing unit 440 (see FIGS. 20 and 22). Therefore, since the temperature measuring unit 500 is brought into direct contact with the material 1 where the foreign substances S are removed, it is possible to suppress an error from occurring between an actual value and a measured value in the temperature of the material 1 due to the presence of the foreign substances S.

The temperature measuring unit 500 is moved downward until the metal element 524 reaches the same height as the sensor part 525. When the metal element 524 reaches the same height as the sensor part 525, the temperature measuring unit 500 is not moved downward any more as the operation of the upward and downward driving member 421 is interrupted (see FIGS. 23 and 24).

In this state, the temperature measuring section 510 measures the temperature of the material 1 using the principle of the thermocouple 513 (S240). When the measurement is completed, the upward and downward driving member 421 is operated again, and the temperature measuring unit 500 is moved upward.

Due to the fact that the foreign substances S formed on the upper surface of the material 1 are removed by the operation of the foreign substance removing unit 440 as described above and the temperature measuring unit 500 measures the temperature of the material 1 by being brought into direct contact with the material 1, the temperature of the material 1 may be precisely measured.

Figure 26:
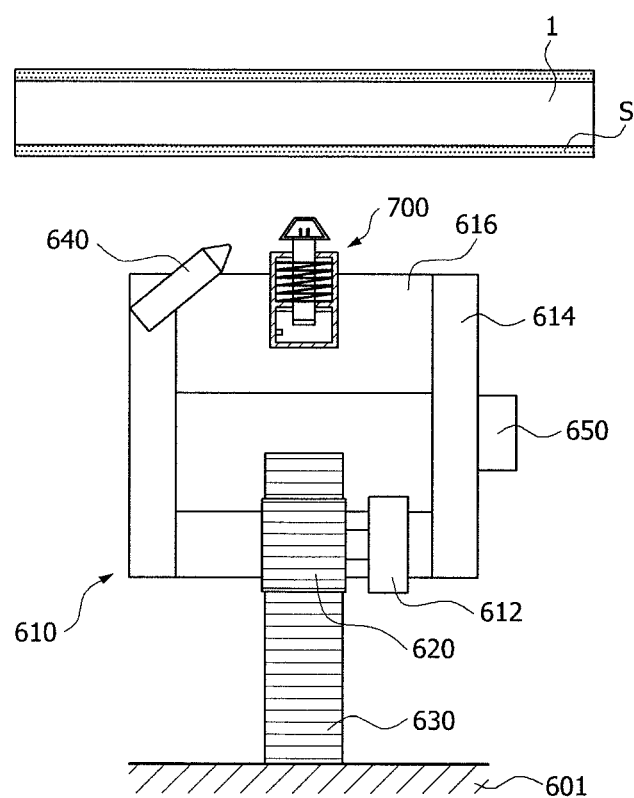
FIG. 26 is a view schematically illustrating an apparatus for measuring the temperature of a material in accordance with a fourth embodiment of the present invention.

Referring to FIG. 26, an apparatus for measuring the temperature of a material in accordance with a fourth embodiment of the present invention is disposed on the exit side of a heating furnace and measures the temperature of a material 1 which is extracted from the heating furnace.

The apparatus for measuring the temperature of a material is placed below the material 1 which is transferred to a roughing mill for performing a post process, by a roller table R. The apparatus for measuring the temperature of a material includes a body unit 610, a temperature measuring unit 700, a moving unit 620 and 630, a foreign substance removing unit 640, and a driving control unit 650.

The body unit 610 is installed to be capable of being moved upward and downward, and includes a driving member 612, a frame member 614 and a fixed member 616.

The driving member 612 includes a motor which generates power for moving the body unit 610 upward and downward, and is mounted to the frame member 614.

The fixed member 616 is fixed to the frame member 614. The fixed member 616 is mounted to the distal ends of the side frames of the frame member 614 to extend in the horizontal direction. The temperature measuring unit 700 may be installed on the fixed member 716, and the foreign substance removing unit 640 may be installed on the fixed member 616 or the frame member 614.

The apparatus for measuring the temperature of a material includes the moving unit 620 and 630 for moving the body unit 610 upward and downward. The moving unit 620 and 630 includes a rotation gear part 620 and a rack gear part 630.

The rotation gear part 620 is connected with the driving member 612 and is rotated by receiving power from the driving member 612. The rack gear part 630 is fastened to an external device 601 and meshes with the rotation gear part 620 to guide the movement of the rotation gear part 620.

Since the external device 601 is to fasten the rack gear part 630, the external device 601 may of course be replaced with a ground or a roller table R capable of fastening rack gear part 630.

In the present embodiment, the rack gear part 630 is exemplified as extending in the vertical direction and providing a vertical movement path. The rotation gear part 620 rotated by receiving power from the driving member 612 meshes with the rack gear part 630 and moves in the vertical direction. The body unit 610 is moved upward and downward by the movement of the rotation gear part 620 on the rack gear part 630.

Although it is illustrated in the present embodiment that the driving member 612 connected with the rotation gear part 620 is installed on the body unit 610 and the rack gear part 630 is fastened to the external device 601, it is to be noted that the present invention is not limited to such a structure.

In other words, it is conceivable that the driving member 612 having the rotation gear part 620 installed thereon may be fastened to the external device 601 and the rack gear part 630 may be installed on the body unit 610, so that a variety of modifications for upward and downward movement of the body unit 610 may be contemplated.

Figure 27:
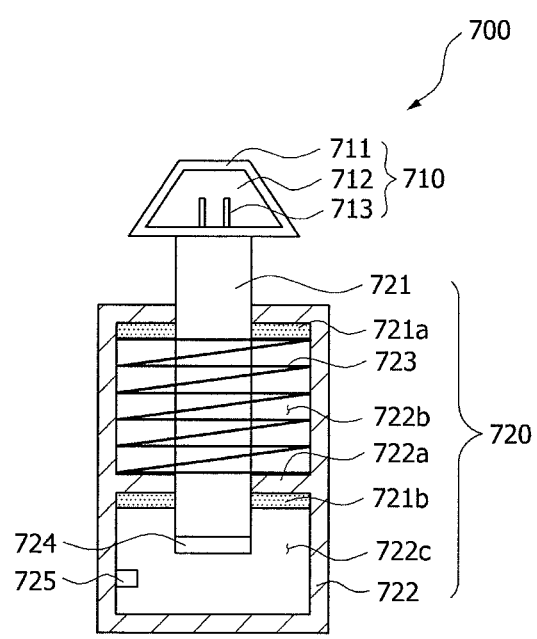
FIG. 27 is a view schematically illustrating the temperature measuring unit of the apparatus for measuring the temperature of a material in accordance with the fourth embodiment of the present invention.

Referring to FIGS. 26 and 27, the temperature measuring unit 700 is installed on the body unit 710, and measures the temperature of the material 1 by being brought into direct contact with the material 1 which is extracted from the heating furnace and is placed on the roller table R. In detail, the temperature measuring unit 700 is installed on the fixed member 616, and includes a temperature measuring section 710 and a contact sensing section 720.

Figure 30:
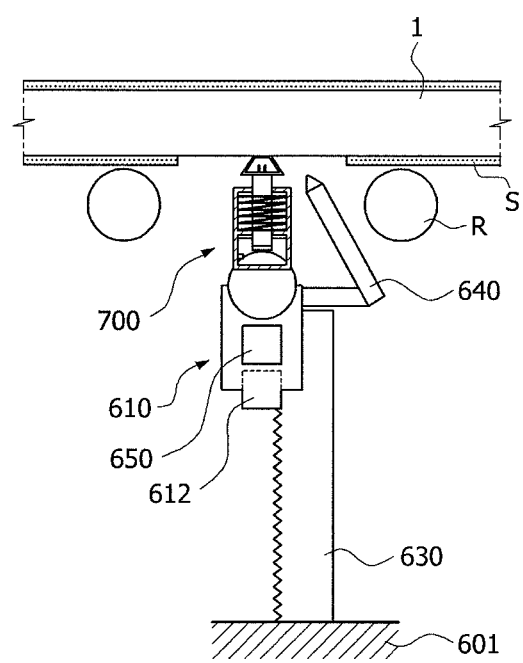
FIG. 30 is a view illustrating a state in which the temperature measuring unit of the apparatus for measuring the temperature of a material in accordance with the fourth embodiment of the present invention is brought into contact with a material.

Referring to FIGS. 27 and 30, the temperature measuring section 710 includes a contact part 711, a heat conductive part 712 and a thermocouple 713. The temperature measuring section 710 measures the temperature of the material 1 by being brought into contact with the material 1.

The contact part 711 is brought into contact with the material 1 by the upward movement of the body unit 610. Since the contact part 711 is a part which is brought into contact with the material 1 with a high temperature, the contact part 711 may be constructed to include a material such as cemented carbide with high hardness and high heat conductivity.

The thermocouple 713 is built in the contact part 711. In the present embodiment, the thermocouple 713 has a shape in which a contact is connected to a protective envelope made of a metal, and is exemplified as a ground type thermocouple which has a good responding speed and may be used in a high temperature and high pressure condition.

The heat conductive part 712 is provided in the contact part 711, and transfers the heat of the material 1 transferred to the contact part 711, to the thermocouple 713. The heat conductive part 712 may be constructed to include a material, such as gold, silver and aluminum, with high heat conductivity.

The contact sensing section 720 includes a support part 721, a housing 722, an elastic member 723, a metal element 724, and a sensor part 725. The contact sensing section 720 is connected with the temperature measuring section 710 and senses whether or not the temperature measuring section 710 is brought into contact with the material 1.

The support part 721 is connected to the lower surface of the contact part 711 and supports the contact part 711. In the present embodiment, the support part 721 is formed to have a circular cylinder-like shape. A first stopper 721*a* and a second stopper 721*b* are fastened to the circumferential outer surface of the support part 721.

The first stopper 721*a* is fastened to the upper portion of the support part 721 and is disposed in an upper space 722*b* which is defined in the housing 722 by a partition wall 722*a*. Since the outer diameter of the first stopper 721*a* corresponds to the inner diameter of the housing 722 which defines the upper space 722*b*, the support part 721 may be moved upward and downward through the housing 722 without fluctuation.

Figure 31:
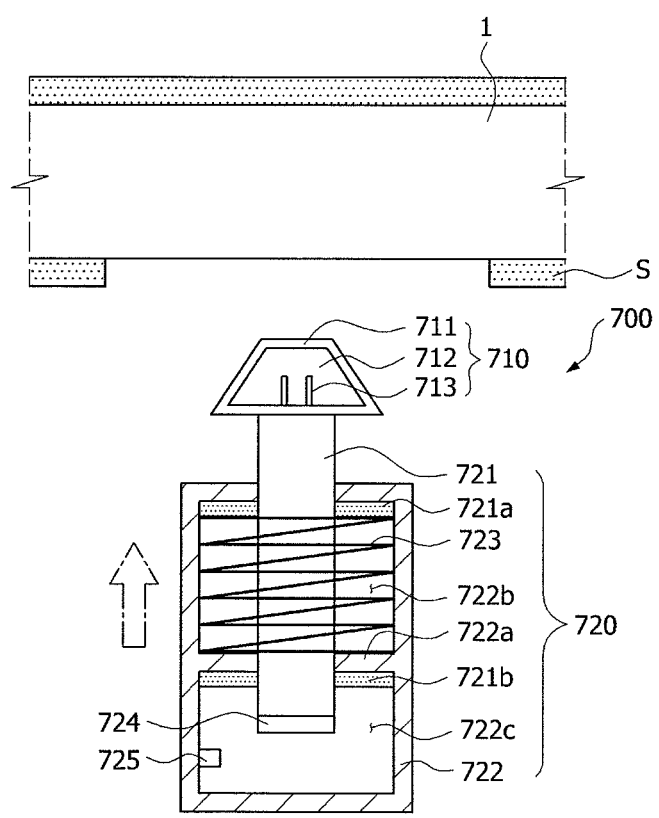
FIG. 31 is a view illustrating a state in which the temperature measuring section of the apparatus for measuring the temperature of a material in accordance with the fourth embodiment of the present invention is moved upward.
Figure 32:
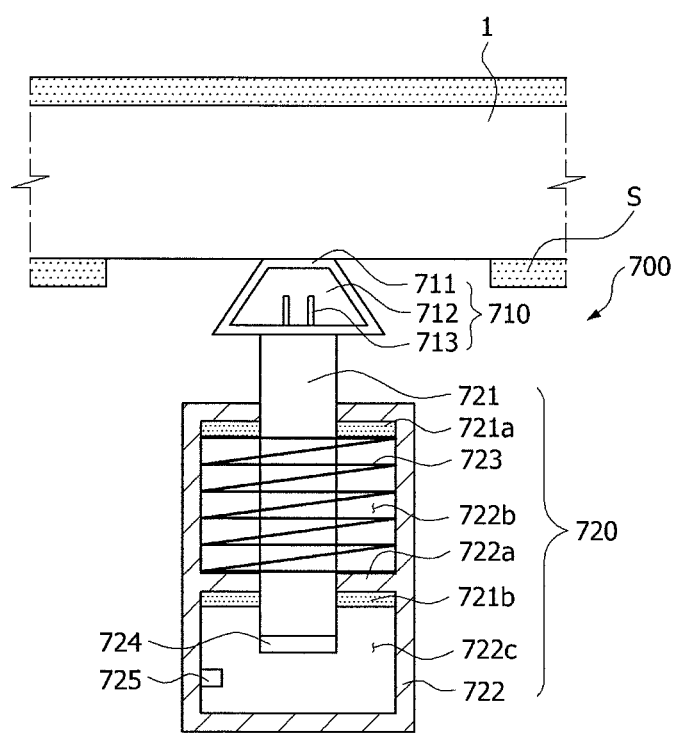
FIG. 32 is a view illustrating a state in which the temperature measuring section of the apparatus for measuring the temperature of a material in accordance with the fourth embodiment of the present invention is brought into contact with the material.
Figure 33:
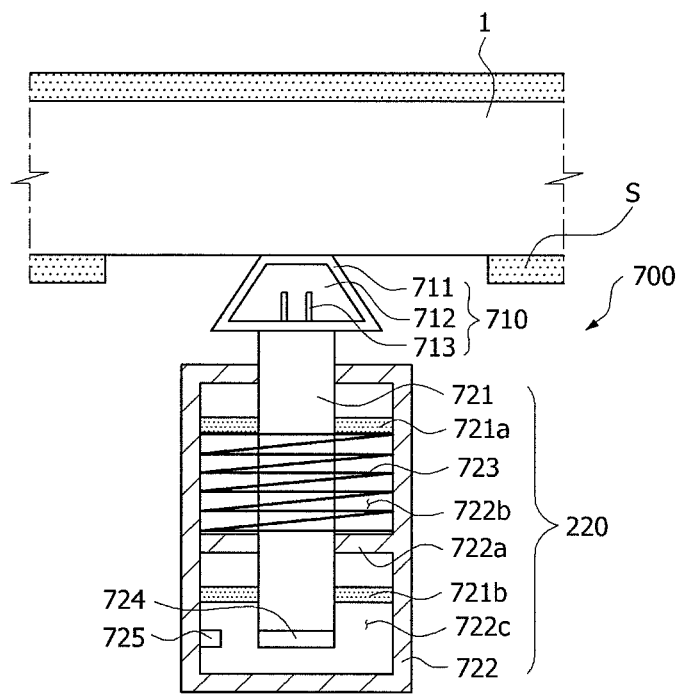
FIG. 33 is a view illustrating a state in which the supporting section of the apparatus for measuring the temperature of a material in accordance with the fourth embodiment of the present invention is moved toward a housing.

Referring to FIGS. 31 to 33, the first stopper 721*a* prevents the support part 721 from being excessively moved upward to be released from the housing 722, when the support part 721 moved downward through the housing 722 is moved upward by the returning force of the elastic member 723. In other words, the upward movement of the support part 721, which is returned toward an original position by the elastic member 723, is stopped when the first stopper 721*a* contacts the top of the upper space 722*b*.

The second stopper 721*b* is fastened to the lower portion of the support part 721 and is disposed in a lower space 722*c* which is defined in the housing 722 by the partition wall 722*a*. The outer diameter of the second stopper 721*b* corresponds to the inner diameter of the housing 722 which defines the lower space 722*c*. Therefore, the support part 721 may be moved upward and downward through the housing 722 without fluctuation by the presence of the first stopper 721*a* and the second stopper 721*b*.

The second stopper 721b prevents the support part 721 from being excessively moved upward to be released from the housing 722, when the support part 721 moved downward through the housing 722 is moved upward by the returning force of the elastic member 723. In other words, the upward movement of the support part 721, which is returned toward the original position by the elastic member 723, is stopped when the second stopper 721b contacts the lower surface of the partition wall 722a.

The housing 722 has a hollow shape such that the support 721 can be moved into and out of the housing 722. In the present embodiment, the housing 722 is formed to have a hollow cylindrical shape. The internal space of the housing 722 is divided into the upper space 722b and the lower surface 722c by the partition wall 722a.

The first stopper 721a is disposed in the upper space 722b, and the second stopper 721b is disposed in the lower space 722c. A through hole is defined in the partition wall 722a such that the support part 721 can pass through the through hole.

As described above, since the inner diameter of the housing 722 which defines the upper space 722b is the same as the outer diameter of the first stopper 721a and the inner diameter of the housing 722 which defines the lower space 722c is the same as the outer diameter of the second stopper 721b, the support part 721 may be moved upward and downward in the housing 722 without fluctuation.

The elastic member 723 has one end which is connected to the lower surface of the first stopper 721a and the other end which is connected to the upper surface of the partition wall 722a. According to this fact, the support part 721 which is moved downward as the contact part 711 is brought into contact with the material 1 is moved upward by the elastic member 723 when the contact between the contact part 711 and the material 1 is released.

Namely, when the contact between the contact part 711 and the material 1 is released so an external force applied to the contact part 711 and the support part 721 is removed, the elastic member 723 provides a returning force for moving the support part 721 upward. In the present embodiment, the elastic member 723 includes a coil spring and is exemplified as surrounding the support part 721.

The metal element 724 is secured to the lower end of the support part 721 and is positioned higher than the sensor part 725 which is provided in the housing 722. The sensor part 725 senses the metal element 724 when the metal element 724 reaches the same height as the sensor part 725 as the support part 721 is moved downward, and transmits a sensed signal to the driving control unit 650.

Figure 34:
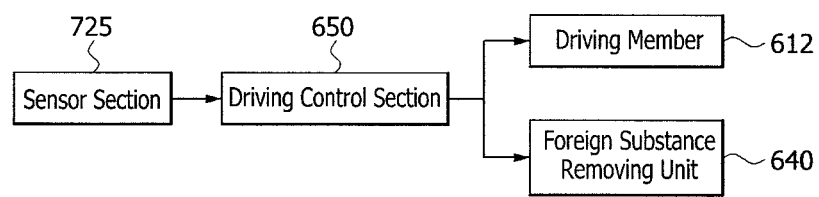
FIG. 34 is a configuration diagram showing the control flow of the apparatus for measuring the temperature of a material in accordance with the fourth embodiment of the present invention.

Referring to FIGS. 33 and 34, the driving control unit 650 interrupts the operation of the driving member 612 on the basis of the signal transmitted from the sensor part 725 to prevent the body unit 610 from being further moved upward. According to this fact, the support part 721 is not moved downward any more.

Referring to FIGS. 31 to 33, the sensor part 725 is provided in the lower space 722c of the housing 722. The sensor part 725 includes a limit sensor, and when the metal element 724 is moved downward to the same height as the sensor part 725, the sensor part 725 senses this and transmits the arrival signal to the driving control unit 650.

Figure 29:
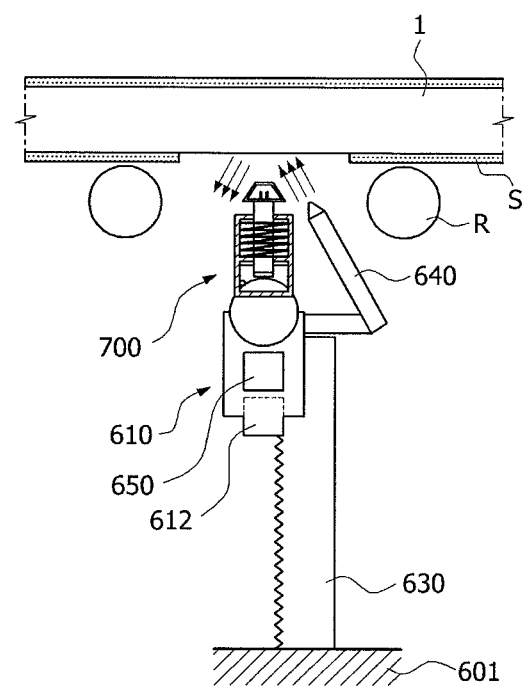
FIG. 29 is a view illustrating a state in which the foreign substance removing unit of the apparatus for measuring the temperature of a material in accordance with the fourth embodiment of the present invention operates.

Referring to FIGS. 26 and 29, the foreign substance removing unit 640 is installed on fixed member 616 or the frame member 614, and injects a fluid with a high pressure toward the lower surface of the material 1 to remove the foreign substances formed on the lower surface of the material 1.

In the present embodiment, the foreign substance removing unit 640 injects the fluid above the temperature measuring unit 700 at a time when the temperature measuring unit 700 is moved upward by the upward movement of the body unit 610.

Before the temperature measuring unit 700 reaches the lower surface of the material 1, foreign substances S formed on the lower surface of the material 1 are removed by the foreign substance removing unit 640. Since the temperature of the material 1 is measured by bringing the temperature measuring section 710 into direct contact with the upper surface of the material 1 with the foreign substances S removed in this way, it is possible to suppress an error from occurring between an actual value and a measured value in the temperature of the material 1 due to the presence of the foreign substances S.

Referring to FIGS. 30, 33 and 34, the driving control unit 650 is connected with the sensor part 725 and controls the operation of the driving member 612. That is to say, when the driving control unit 650 receives the arrival signal from the sensor part 725, the driving control unit 650 interrupts the operation of the driving member 612 to prevent the temperature measuring section 710 from being moved upward any more.

Hereafter, a method for measuring the temperature of a material using the apparatus for measuring the temperature of a material in accordance with the fourth embodiment of the present invention will be described with reference to FIGS. 26 to 34.

Figure 25:
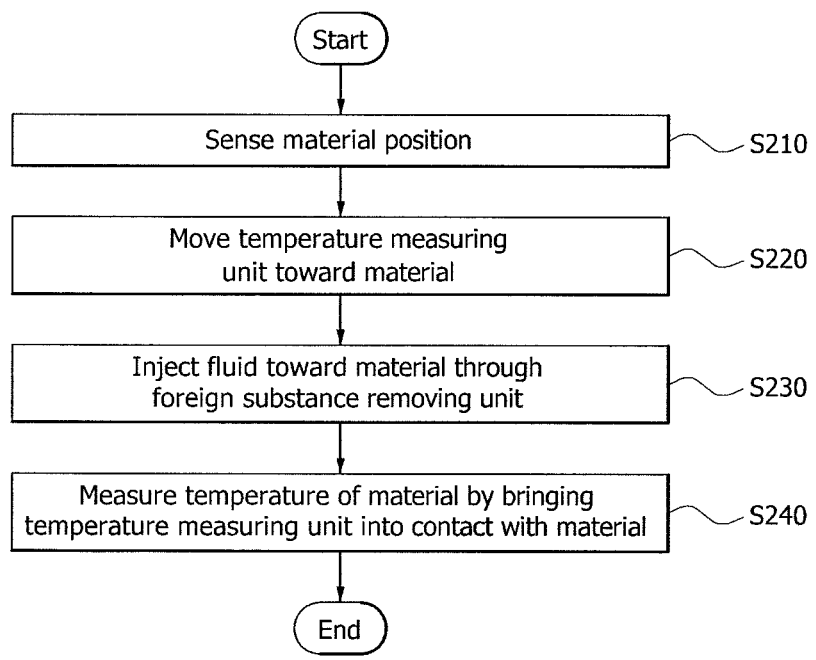
FIG. 25 is a flow chart explaining a method for measuring the temperature of a material by using the apparatus for measuring the temperature of a material in accordance with the third embodiment of the present invention.

In order to measure the temperature of the material 1, the position of the material 1 which is transferred from a heating furnace is sensed (see FIG. 25). After being extracted from the heating furnace, the material 1 is transferred onto the roller table R by an extractor (not shown). The apparatus for measuring the temperature of a material is disposed below the roller table R, and if the material 1 is placed on the roller table R by the extractor, an operation for measuring a temperature is started.

Figure 28:
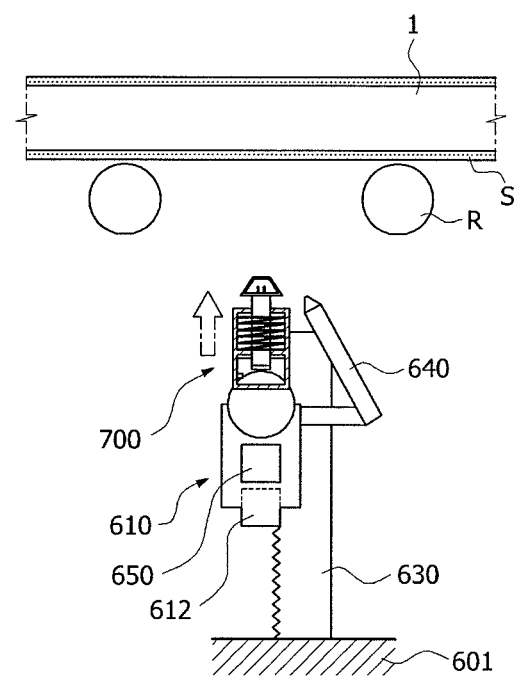
FIG. 28 is a view illustrating a state in which the apparatus for measuring the temperature of a material in accordance with the fourth embodiment of the present invention is moved upward.

When the material 1 is placed on the roller table R, the temperature measuring unit 700 is moved toward the lower surface of the material 1 (see FIGS. 25 and 28). The temperature measuring unit 700 is moved upward until the temperature measuring unit 700 is brought into contact with the lower surface of the material 1 (see FIG. 31).

The movement of the temperature measuring unit 700 is implemented through the operation of the driving member 612 (see FIGS. 26 and 34). If the roller table R senses the placement of the material 1 and transmits a corresponding signal to the driving control unit 650, the driving control unit 650 controls the operation of the driving member 612 such that the body unit 610 is moved upward. The temperature measuring unit 700 is moved upward by the body unit 610 moved upward in this way.

When the temperature measuring unit 700 is moved upward, the driving control unit 650 operates the foreign substance removing unit 640 (see FIGS. 26 and 34). According to this fact, the foreign substance removing unit 640 injects the fluid at a high pressure to the lower surface of the material 1 and removes the foreign substances S which are formed on the lower surface of the material 1 (see FIGS. 25 and 29).

The temperature measuring unit 700 is continuously moved upward by the operation of the driving member 612 and is brought into contact with the lower surface of the material 1 removed with the foreign substances S by the foreign substance removing unit 640 (see FIGS. 30 and 32). Therefore, since the temperature measuring unit 700 is brought into direct contact with the material 1 where the foreign substances S are removed, it is possible to suppress an error from occurring between an actual value and a measured value in the temperature of the material 1 due to the presence of the foreign substances S.

The temperature measuring unit 700 is moved downward until the metal element 724 reaches the same height as the sensor part 725. When the metal element 724 reaches the same height as the sensor part 725, the temperature measuring unit 700 is not moved upward any more as the operation of the driving member 612 is interrupted (see FIGS. 33 and 34).

In this state, the temperature measuring section 710 measures the temperature of the material 1 using the principle of the thermocouple 713 (see FIG. 25). When the measurement is completed, the driving member 612 is operated again, and the temperature measuring unit 700 is moved downward.

Due to the fact that the foreign substances S formed on the lower surface of the material 1 are removed by the operation of the foreign substance removing unit 640 as described above and the temperature measuring section 710 measures the temperature of the material 1 by being brought into direct contact with the material 1, the temperature of the material 1 may be precisely measured.

As is apparent from the above descriptions, the apparatus and the method for measuring the temperature of a material according to the embodiments of the present invention provide advantages in that, since the temperature of a material is measured after removing foreign substances, such as scale and the like, which have formed on the surface of the material, the reliability of the measurement of the temperature of the material may be improved.

Also, in the apparatus and the method for measuring the temperature of a material according to the embodiments of the present invention, since the temperature of the material may be precisely measured, the temperature control performance of a heating furnace may be improved on the basis of the temperature measurement, whereby it is possible to achieve improvements in the quality of a product and the productivity.

Further, in the apparatus and the method for measuring the temperature of a material according to the embodiments of the present invention, since a temperature measuring unit may be covered by selectively opening and closing a protection unit, it is possible to prevent foreign substances from accumulating on the temperature measuring unit.

The embodiments of the present invention have been disclosed above for illustrative purposes. Those skilled in the art will appreciate that various modifications, additions and substitutions are possible. For example, while an apparatus and a method for measuring the temperature of a material extracted from a heating furnace have been exemplarily described, this is for an illustration purpose only, and the apparatus and the to method for measuring the temperature of a material according to the present invention may be applied to a material which is extracted from a device other than the heating furnace. Therefore, the true scope of the present invention should be defined on the basis of the appended claims.

What is claimed is:

1. An apparatus for measuring a temperature of a material traveling relative to the apparatus, the apparatus comprising:
   a body;
   a temperature measurement device installed on the body and configured to measure a temperature of a material at a distance from the temperature measurement device while the material is traveling relative to the body;
   a first fluid injector installed on the body and configured to inject fluid toward the material to blow substances away from a surface of the material to clear the surface for more accurate measurement of temperature of the material;
   a second fluid injector configured to inject fluid in a direction to a space over the temperature measurement device to prevent substances blown by fluid injection of the first fluid injector from blocking the temperature measurement device; and
   a movement mechanism installed on the body and configured to move the temperature measurement device relative to the material.

2. The apparatus according to claim 1, further comprising:
   a protector unit configured to cover the temperature measurement device, wherein the protector unit comprises:
      a protection member capable of sliding to selectively cover the temperature measurement device; and
      an opening and closing member configured to cause the protection member to slide relative to the temperature measurement device.

3. The apparatus according to claim 2, wherein the body comprises:
   a fixed member on which the temperature measurement device is installed; and
   a frame member configured to support the fixed member, wherein the protection member is mounted to the fixed member and prevents the temperature measurement device and the material from colliding each other.

4. The apparatus according to claim 1, wherein the movement mechanism comprises:
   a rotation gear installed on the body and configured to be rotated by driving of a driving member; and
   a rack gear engaged with the rotation gear and configured to guide a linear movement of the rotation gear.

5. The apparatus according to claim 1, wherein the temperature measurement device comprises:
   a thermometer for measuring the temperature of the material; and
   a displacement sensor for sensing the distance between the thermometer and the material.

6. The apparatus according to claim 1, wherein the movement mechanism comprises:
   a forward and rearward moving unit configured to move the temperature measurement device forward and rearward; and
   an upward and downward moving unit configured to move the temperature measurement device upward and downward.

7. The apparatus according to claim 6, wherein the upward and downward moving unit comprises:
   a first rotation gear configured to be rotated by driving of a first driving member which is installed on the body; and
   a first rack gear engaged with the first rotation gear and configured to guide upward and downward movement of the first rotation gear, and
   wherein the forward and rearward moving unit comprises:
      a support plate coupled to the first rack gear;
      a second rotation gear configured to be rotated by driving of a second driving member which is installed on the support plate; and
      a second rack gear engaged with the second rotation gear and configured to guide forward and rearward movement of the second rotation gear.

8. The apparatus according to claim 7, wherein the temperature measurement device comprises:
   a thermometer for measuring the temperature of the material; and a displacement sensor for sensing the distance between the thermometer and the material.

9. An for measuring a temperature of a material traveling relative to the apparatus, the apparatus comprising:
   a body;
   a temperature measurement device installed on the body and configured to measure a temperature of a material while the material is traveling relative to the body;
   a fluid injector installed on the body and configured to inject fluid toward the material to blow substances away from a surface of the material to clear the surface for more accurate measurement of temperature of the material; and
   a movement mechanism installed on the body and configured to move the temperature measurement device relative to the material,
   wherein the temperature measurement device comprises:
      a temperature measuring section configured to be brought into contact with the material and further configured to measure the temperature of the material when the temperature measuring section is in contact with the material; and
      a contact sensing section configured to sense whether or not the temperature measuring section and the material are brought into contact with each other.

10. The apparatus according to claim 9, wherein the temperature measuring section comprises:
   a contact part configured to contact the material;
   a thermocouple disposed in the contact part; and
   a heat conductive part provided in the contact part and configured to transfer heat of the material transferred to the contact part to the thermocouple.

11. The apparatus according to claim 10, wherein the contact sensing section comprises:
   a support part configured to be connected with the contact part;
   a housing configured to guide upward and downward movement of the support part; and
   a sensor part installed in the housing and configured to sense movement of the support part.

12. The apparatus according to claim 11, wherein the contact sensing section further comprises:
   a partition wall dividing a space in the housing into an upper space and a lower space and configured to allow the support part to pass therethrough;
   a first stopper secured to the support part and disposed in the lower space; and
   an elastic member having one end which is connected to the first stopper and the other end which is connected to the partition wall, thereby providing a returning force to the support part.

13. The apparatus according to claim 12, wherein a metal element is attached to an upper end of the support part, and
   wherein an outer diameter of the first stopper is the same as an inner diameter of the housing which defines the lower space.

14. The apparatus according to claim 13, wherein the contact sensing section further comprises a second stopper secured to the support part and disposed in the upper space, and
   wherein an outer diameter of the second stopper is the same as an inner diameter of the housing which defines the upper space.

15. The apparatus according to claim 9, wherein the movement mechanism comprises:
   a forward and rearward moving unit configured to move the temperature measurement device forward and rearward; and
   an upward and downward moving unit configured to move the temperature measurement device upward and downward,
   wherein the upward and downward moving unit comprises:
      a first rotation gear configured to be rotated by driving of a first driving member which is installed on the body; and
      a first rack gear engaged with the first rotation gear and configured to guide upward and downward movement of the first rotation gear, and wherein the forward and rearward moving unit comprises:
      a support plate coupled to the first rack gear;
      a second rotation gear configured to be rotated by driving of a second driving member which is installed on the support plate; and
      a second rack gear part engaged with the second rotation gear and configured to guide forward and rearward movement of the second rotation gear.

16. The apparatus according to claim 9, wherein the movement mechanism comprises:
   a rotation gear configured to be rotated by driving of a driving member; and
   a rack gear engaged with the rotation gear and configured to guide upward and downward movement of the rotation gear, and
   wherein the body comprises:
      a fixed member having the temperature measurement device installed thereon; and
      a frame member configured to support the fixed member and having the rotation gear part installed thereon.

17. A method of measuring a temperature of a material, the method comprising:
   traveling a material comprising a surface in a traveling direction;
   moving a temperature measurement device relative to the surface of the material in a direction perpendicular to the surface while the material is traveling in the traveling direction;
   injecting first fluid to the surface of the material, while the material is traveling in the traveling direction, to blow substances away from the surface of the material;
   injecting second fluid in a direction to a space over the temperature measurement device, while the material is traveling in the traveling direction, to prevent substances blown from the surface from blocking the temperature measurement device; and
   measuring the temperature of the material using the temperature measurement device when the temperature measurement device is distanced from the surface.

18. The method according to claim 17, further comprising:
   determining a distance between the temperature measurement device and the surface;
   causing the temperature measurement device to measure the temperature when the temperature measurement device is at a predetermined distance from the surface.

19. A method of measuring a temperature of a material, the method comprising:
   traveling a material comprising a surface in a traveling direction;

injecting fluid toward the surface of the material, while the material is traveling in the traveling direction, to blow substances away from the surface of the material;

while the material is traveling in the traveling direction, moving a temperature measurement device toward the surface of the material in a direction perpendicular to the surface until the temperature measurement device contacts the material;

determining whether the temperature measuring device has contacted the material to control movement of the temperature measurement device; and measuring temperature of the material using the temperature measurement device while the temperature measurement device is in contact with the material and further while the material is traveling in the traveling direction.

* * * * *